(12) United States Patent
Eitschberger et al.

(10) Patent No.: US 12,221,275 B2
(45) Date of Patent: Feb. 11, 2025

(54) MOBILE PERFORATING BANK UNIT AND MODULAR STORAGE CONTAINER

(71) Applicant: DynaEnergetics Europe GmbH, Troisdorf (DE)

(72) Inventors: Christian Eitschberger, Munich (DE); Liam McNelis, Bonn (DE); Thilo Scharf, Donegal (IE); Gernot Uwe Burmeister, Austin, TX (US); Dimitri Riesen, Troisdorf (DE)

(73) Assignee: DynaEnergetics Europe GmbH, Troisdorf (DE)

( * ) Notice: Subject to any disclaimer, the term of this patent is extended or adjusted under 35 U.S.C. 154(b) by 42 days.

(21) Appl. No.: 17/972,768

(22) Filed: Oct. 25, 2022

(65) Prior Publication Data

US 2023/0138182 A1 May 4, 2023

Related U.S. Application Data

(60) Provisional application No. 63/325,727, filed on Mar. 31, 2022, provisional application No. 63/273,626, filed on Oct. 29, 2021.

(51) Int. Cl.
*B65D 88/12* (2006.01)
*B65D 85/02* (2006.01)
*B65D 90/00* (2006.01)

(52) U.S. Cl.
CPC ........... *B65D 88/127* (2013.01); *B65D 85/02* (2013.01); *B65D 88/128* (2013.01); *B65D 90/0073* (2013.01); *B65D 2588/12* (2013.01)

(58) Field of Classification Search
CPC ................. B65D 2588/12; B65D 90/0073; B65D 85/02; B65D 88/127; B65D 88/128

(Continued)

(56) References Cited

U.S. PATENT DOCUMENTS 1,870,676 A * 8/1932 Franklin ............... B65D 85/02
217/52
2,954,140 A 9/1960 Sutherland et al.
(Continued)

FOREIGN PATENT DOCUMENTS

| CA | 2606873 A1 | 7/2014 |
|---|---|---|
| CN | 2764605 | 3/2006 |

(Continued)

OTHER PUBLICATIONS

Canadian Intellectual Property Office, Office Action of International App. No. EP2016076877, which is in the same family as U.S. Appl. No. 15/,781,876, dated Jun. 17, 2019, 3 pgs.

(Continued)

*Primary Examiner* — Rafael A Ortiz

(74) *Attorney, Agent, or Firm* — Womble Bond Dickinson (US) LLP

(57) ABSTRACT

Disclosed embodiments relate to devices and methods for storage and/or transport of tubular structures, such as perforating guns for use in wellbores. Some embodiments relate to modular storage containers, for example which may be height adjustable depending on the length of the tubular structure to be held therein. Some embodiments relate to mobile storage banks, which may be configured for use with the modular storage containers. In some embodiments, the storage bank may further be configured with one or more longitudinal compartments configured to hold used tool strings or portions thereof.

5 Claims, 18 Drawing Sheets

(58) Field of Classification Search
USPC .............. 220/1.5, 475; 102/464, 466, 467; 175/78, 257
See application file for complete search history.

(56) References Cited

U.S. PATENT DOCUMENTS

| | | | |
|---|---|---|---|
| 3,181,693 A | 5/1965 | Freistat | |
| 3,757,933 A | 9/1973 | Banta | |
| 3,838,643 A | 10/1974 | Austin et al. | |
| 4,055,247 A | 10/1977 | Benedick et al. | |
| 4,106,597 A | 8/1978 | Shook et al. | |
| 4,286,708 A | 9/1981 | Porzel | |
| 4,432,285 A | 2/1984 | Boyars et al. | |
| 4,440,296 A | 4/1984 | Howe et al. | |
| 4,640,418 A | 2/1987 | Lowry | |
| 4,805,776 A | 2/1989 | Namgyal et al. | |
| 4,898,104 A | 2/1990 | Savoy et al. | |
| 4,955,480 A | 9/1990 | Sexton | |
| 4,973,358 A | 11/1990 | Jin et al. | |
| 5,097,945 A | 3/1992 | Brooks | |
| 5,151,246 A | 9/1992 | Baumeister et al. | |
| 5,158,173 A | 10/1992 | Halsey et al. | |
| 5,160,473 A | 11/1992 | Bontrager | |
| 5,181,549 A | 1/1993 | Shapovalov | |
| 5,219,504 A | 6/1993 | Insley | |
| 5,248,055 A | 9/1993 | Sanal et al. | |
| 5,356,009 A | 10/1994 | Lubowitz | |
| 5,390,580 A | 2/1995 | Gibbons et al. | |
| 5,450,948 A | 9/1995 | Beausoleil et al. | |
| 5,654,053 A | 8/1997 | Crane et al. | |
| 5,996,777 A | 12/1999 | Capers, III | |
| 6,196,107 B1 | 3/2001 | Hoffman et al. | |
| 6,305,539 B1 | 10/2001 | Sanders | |
| 6,347,700 B1 | 2/2002 | Redfield et al. | |
| 6,354,457 B1 * | 3/2002 | Aaron .................. | F17C 1/00 220/582 |
| 6,391,250 B1 | 5/2002 | Wolfsgruber et al. | |
| 6,454,085 B1 | 9/2002 | Barker | |
| 6,581,504 B2 | 6/2003 | Caron | |
| 6,698,331 B1 | 3/2004 | Yu et al. | |
| 7,036,418 B2 | 5/2006 | Greenfield et al. | |
| 7,152,736 B1 | 12/2006 | Menichini | |
| 7,204,183 B2 | 4/2007 | Cirillo | |
| 7,308,847 B2 | 12/2007 | Walker | |
| 7,343,843 B2 | 3/2008 | Sharpe et al. | |
| 7,416,076 B2 | 8/2008 | Barton et al. | |
| 7,789,006 B2 | 9/2010 | Walker | |
| 8,079,465 B2 | 12/2011 | Edwards et al. | |
| 8,505,723 B2 | 8/2013 | Clark et al. | |
| 8,719,118 B2 | 5/2014 | Hacker | |
| 10,895,114 B2 | 1/2021 | Luharuka et al. | |
| 10,914,563 B2 | 2/2021 | Monelis et al. | |
| 2002/0092793 A1 | 7/2002 | Barker | |
| 2005/0136281 A1 | 6/2005 | Morales et al. | |
| 2005/0150781 A1 | 7/2005 | Barton et al. | |
| 2005/0247450 A1 | 11/2005 | Ratanasiriguichai et al. | |
| 2007/0131684 A1 | 6/2007 | Cirillo et al. | |
| 2007/0248807 A1 | 10/2007 | Kaschak et al. | |
| 2008/0093251 A1 | 4/2008 | Meyer | |
| 2008/0282924 A1 | 11/2008 | Saenger et al. | |
| 2010/0239404 A1 | 9/2010 | Blanchard et al. | |
| 2011/0290792 A1 * | 12/2011 | Krzak .................. | F25D 3/08 220/1.5 |
| 2011/0297269 A1 | 12/2011 | Pilon et al. | |
| 2012/0186168 A1 | 7/2012 | McPhee | |
| 2014/0008247 A1 | 1/2014 | Monelis et al. | |
| 2015/0060440 A1 * | 3/2015 | Lippold .................. | B65D 81/38 220/1.5 |
| 2015/0202838 A1 | 7/2015 | Jang et al. | |
| 2016/0211038 A1 | 7/2016 | Houillon | |
| 2021/0123711 A1 | 4/2021 | Mcnelis et al. | |

FOREIGN PATENT DOCUMENTS

| | | | |
|---|---|---|---|
| CN | 102538606 A | 7/2012 | |
| CN | 202345492 U | 7/2012 | |
| CN | 106639479 A | 5/2017 | |
| CN | 209795300 U | 12/2019 | |
| CN | 215204636 U | 12/2021 | |
| DE | 3824784 A1 * | 1/1990 | |
| EP | 0299253 A1 | 1/1989 | |
| GB | 2355057 A | 4/2001 | |
| GB | 2479868 A | 11/2011 | |
| GB | 2514798 A | 12/2014 | |
| WO | 2010003858 A1 | 1/2010 | |

OTHER PUBLICATIONS

Energy API, Recommended Practice for Oilfield Explosives Safety, May 2007, 28 pages.
Havel Metal Foam, Innovative Solutions for lightweight Construction, Dec. 4, 2015, 4 pgs., http://www.havel-mf.de/index_en.html.
Havel Metal Foam, Metal foam sandwiches for civil protection and mobile infrastructure, May 12, 2015, 2 pgs., http://en.havel-mf.com/home.
Institute of Makers of Explosives, Recommendations for Safe and Secure Use, Storage, and Transportation of Commercial Explosives in Oil and Gas Operations, Oct. 2018, 69 pages.
International Search Report and Written Opinion of International App. No. PCT/EP2016/076877, mailed Jan. 20, 2017, 12 pgs.
Kerry J. Libbert, Performance Oriented Packaging Testing of PPP-B-601 Wood Box For 300 GR/FT Flexible Linear Shaped Charge For Packing Group II Solid Hazardous Materials, Presented to Naval Surface Warfare Center, Crane, Indiana, Nov. 1993, 10 pgs.
The British Columbia Gazette, Part II, Jul. 27, 2021, vol. 64, No. 15, 23 pages.
Troy S. Walker, Gun Loading Facility, MENAPS-11-03 Gun Loading Facility (GLF), 22 pages.
Uniteam, Special Containers, Storage Containers for Explosives, Jun. 5, 2017, 3 pgs., https://www.uniteam.com/en/containers/special-containers/explosive-containers/.
United States Patent and Trademark Office, Non-Final Office Action of U.S. Appl. No. 15/781,876, dated Jul. 8, 2020, 18 pages.
United States Patent and Trademark Office; Non-Final Office Action for U.S. Appl. No. 17/142,275; dated Feb. 3, 2022; 13 pages.
United States Patent and Trademark Office; Notice of Allowance for U.S. Appl. No. 15/781,876; Oct. 14, 2020; 11 pages.
API Energy, Recommended Practice for Oilfield Explosives Safety, May 2007, 28 pgs., https://vdoc.pub/documents/api-rp-67-2nd-ed-may-2007-recommended-practice-for-oilfield-explosives-safety-2oqgqfeoi2n0.
Institute of Makers of Explosives, Recommendations for Safe and Secure Use, Storage, and Transportation of Commercial Explosives in Oil and Gas Operations, Oct. 2018, 69 pgs., https://www.ime.org/uploads/public/slp32.pdf.
The British Columbia Gazette, Part II, Workers Compensation Act, vol. 64, No. 15, 207/2021, Jul. 27, 2021, 23 pgs., https://www.bclaws.gov.bc.ca/civix/document/id/lc/bcgaz2/v64n15_207-2021.
Troy S Walker, Gun Loading Facility, 22 pgs., http://www.perforators.org/wp-content/uploads/2015/10/5-MENAPS-11-03-Gun-Loading-Facility-GLF.pdf.

* cited by examiner

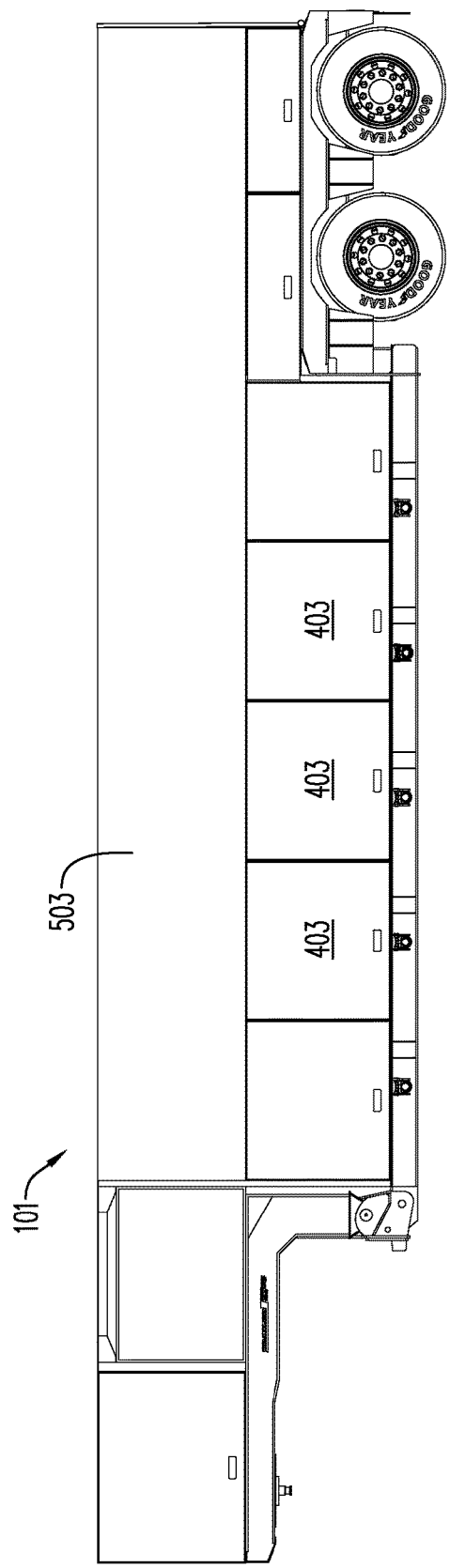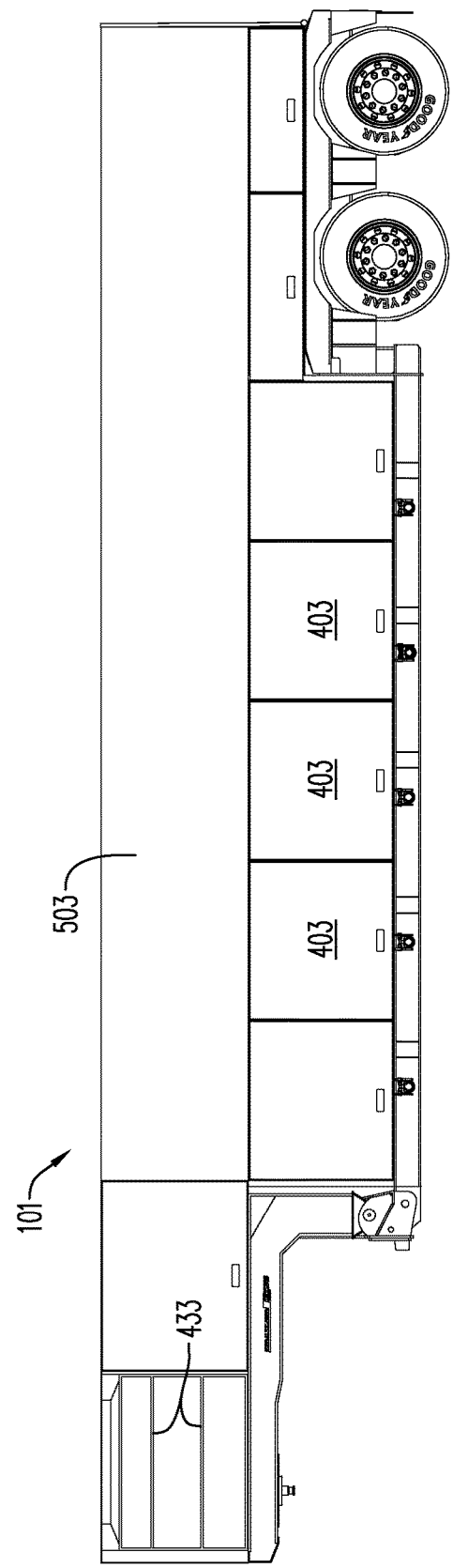

)# MOBILE PERFORATING BANK UNIT AND MODULAR STORAGE CONTAINER

CROSS-REFERENCE TO RELATED APPLICATIONS

This application claims the benefit of United States Provisional Patent Application No. 63/325,727 filed Mar. 31, 2022, as well as benefit to U.S. Provisional Patent Application No. 63/273,626 filed Oct. 29, 2021, the entire contents of both of which are incorporated herein by reference.

BACKGROUND OF THE DISCLOSURE

The onshore oil and gas industry requires on-site operational efficiency for well completions. Such efficiencies typically include preparing tool strings for downhole deployment as well as breaking down used tool strings for disposal. For the shale market, for example, these preparation and breaking down measures are an extremely critical factor, especially during plug and perf pump-down operations.

Pre-configured and factory-assembled perforating gun assemblies, which may include fully pre-assembled perforating guns and partially pre-configured perforating guns, are developing as a new standard in the market for economic perforating operations and well completions. The shipping and receiving of loaded perforating gun assemblies is extremely important in view of both cost and timely delivery, as well as the disposal and/or recycling of spent or used perforating guns. Disposal of excessive amounts of product packaging and shipment crates is also problematic.

Current perforating gun transport boxes, which are used to ship shorter perforating guns (used in hydraulic reservoir stimulation operations during completion process) are usually made of wood. These wooden boxes are normally used a single time, particularly since they could easily be damaged during the opening process or through handling at the well site. In addition, wooden boxes may be difficult to standardize due to different gun length, even with guns of the same diameter. Common selective perforating guns may vary from 1 shot to 8 shots, which represents a length difference of up to several feet.

There is need for a storage system that addresses the current challenges regarding logistics of shipping and storing perforating gun assemblies and tool string assembly at the wellsite. There is a further need for a modular transport system for tubular structures. There is a need for a modular perforating gun storage container.

BRIEF DESCRIPTION OF THE EXEMPLARY EMBODIMENTS

According to an aspect, the exemplary embodiments include a modular storage container for holding a plurality of tubular structures. By way of example, the modular storage container may include a plurality of fixation panels, each having a plurality of openings therethrough which are configured for receiving and bounding a portion of each of the plurality of tubular structures. The plurality of fixation panels can be configured to be used together with aligned openings to retain the tubular structures. For example, the plurality of fixation panels may be configured to be used together such that corresponding openings of the plurality of openings in each of the fixation panels align to form a plurality of aligned openings configured to retain the tubular structures (e.g. with corresponding openings in adjacent fixation panels aligning).

In another aspect, the exemplary embodiments include a fixation panel for use with a plurality of tubular structures. By way of example, the fixation panel may include a plurality of openings therethrough configured for receiving and supporting a portion of each of the plurality of tubular structures. A plurality of such fixation panels may be configured to be used together (e.g. stacked) with aligned openings to retain the plurality of tubular structures. In some embodiments, the fixation panel may include at least one removable stacking feature configured for adjacent stacking arrangement of a plurality of fixation panels.

In a further aspect, the exemplary embodiments include a transport or storage system for a plurality of tubular structures. In some embodiments, the transport system may include a storage bank configured to hold the plurality of tubular structures laterally within the storage bank. By way of example, the tubular structures may be held within a grid of pockets oriented perpendicular to a longitudinal center axis of the storage bank.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which:

FIG. 19 is a side view of a mobile explosive storage bank, illustrating a plurality of upper storage chambers, according to an aspect;

FIG. 20 is a side view of a mobile explosive storage bank, illustrating a plurality of upper storage chambers, according to an aspect;

Figure 1A:
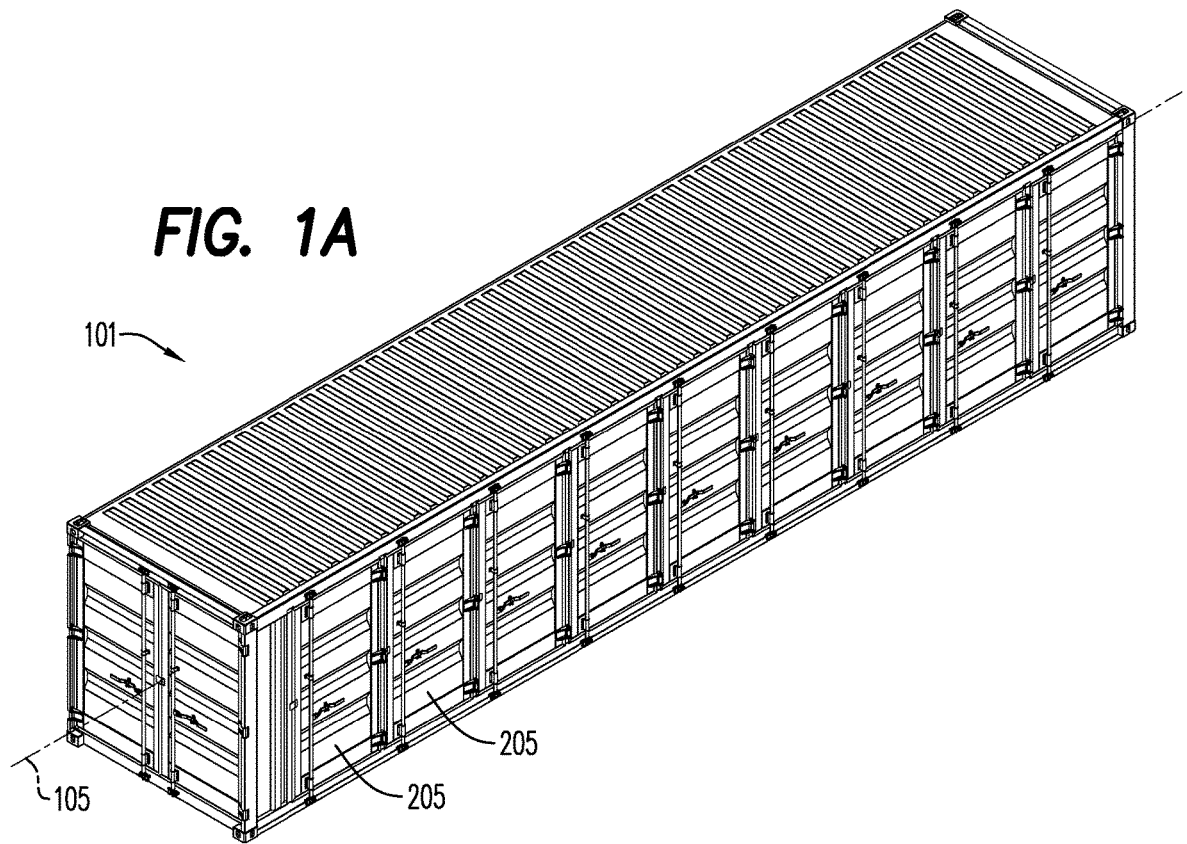
FIG. 1A is a top, left-side perspective view of a mobile perforating tool storage bank, according to an embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to aid in understanding the features of the exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments. It is understood that reference to a particular "exemplary embodiment" of, e.g., a structure, assembly, component, configuration, method, etc. includes exemplary embodiments of, e.g., the associated features, subcomponents, method steps, etc. forming a part of the "exemplary embodiment".

For purposes of this disclosure, the phrases "devices," "systems," and "methods" may be used either individually or in any combination referring without limitation to disclosed components, grouping, arrangements, steps, functions, or processes.

Embodiments of this disclosure are associated with a perforating tool storage bank. The perforating tool storage bank may be configured as a mobile unit, capable of transporting, storing, and yielding, as required, pre-assembled perforating gun bodies before deployment into a wellbore. As used herein, the phrase "mobile" refers to the ability to be moved from one location to another. For example, a mobile unit may be able to be moved from a first location to a second location without having to be disassembled prior to being moved from the first location to the second location.

The figures will initially be described in an overview as an introduction, followed by more detailed discussion of various storage container, storage bank, and method embodiments relating to same, with specific reference to reference numerals corresponding to specific elements.

The perforating tool storage bank may be configured to be transported via a standard road vehicle (typically a truck or lorry) to the wellsite prior to the perforation assignment.

Figure 1B:
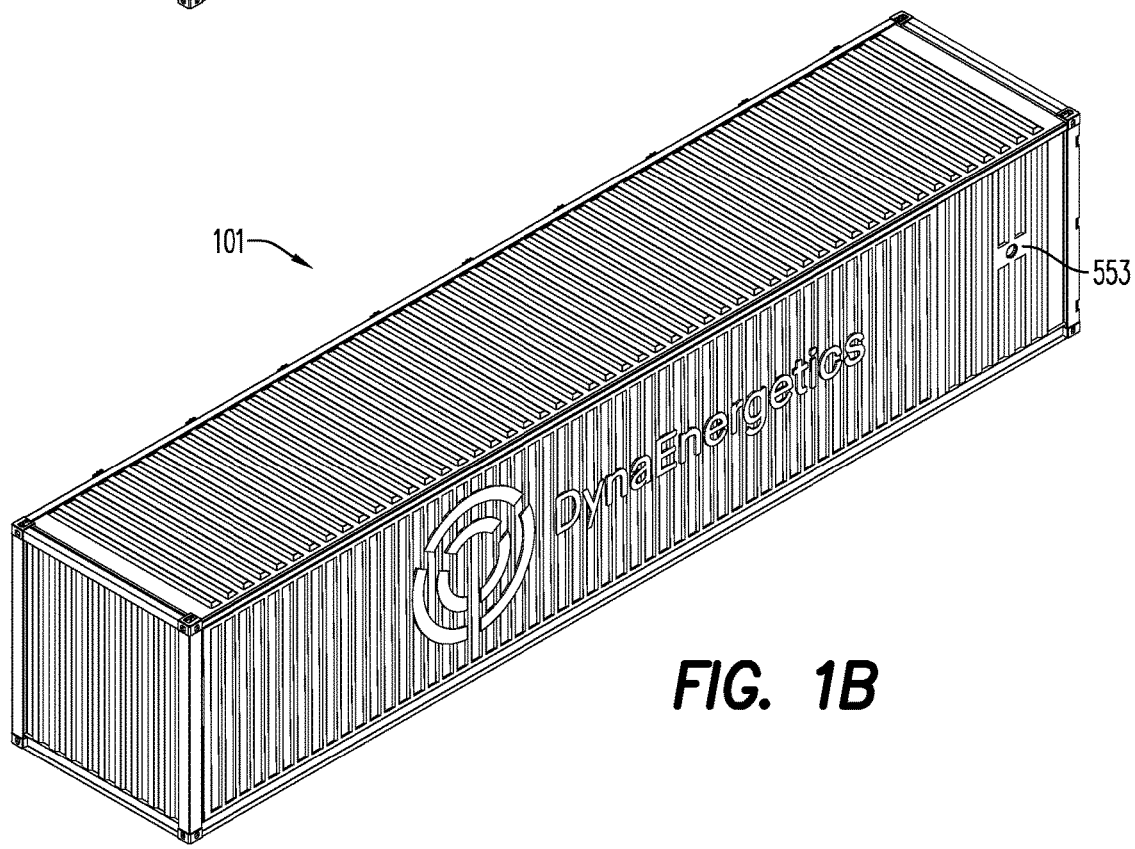
FIG. 1B is a top, right-side perspective view of a mobile perforating tool storage bank, according to an embodiment.

FIG. 1A and FIG. 1B illustrate side, perspective views of a mobile perforating storage bank, according to an embodiment. It is contemplated that a side-section, compartment, or unit of the mobile perforating storage bank will be configured to contain at least one of secured-shelfs, magazines, and storage units/containers, for securely transporting and storing loaded perforated gun assemblies before the perforating gun assemblies are deployed into a wellbore.

Figure 2:
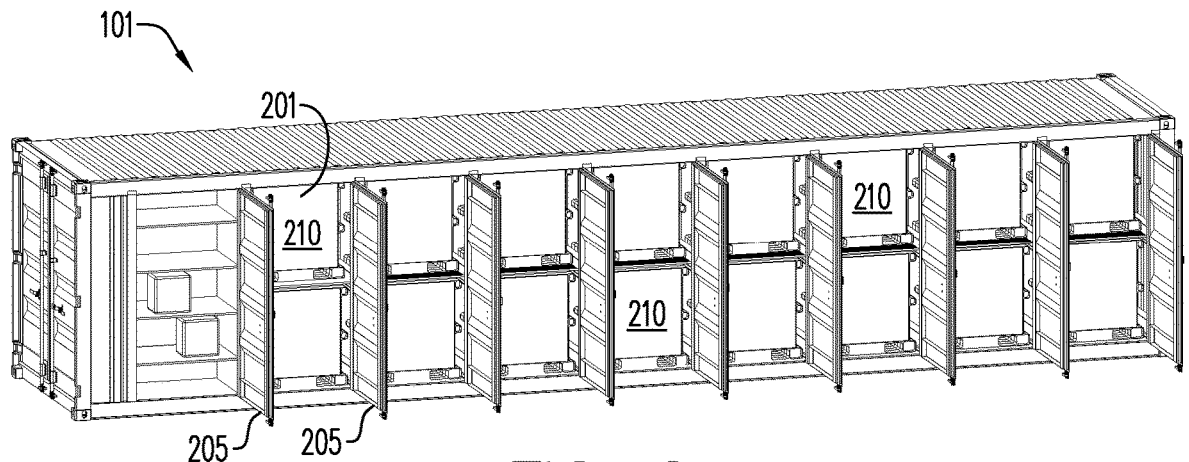
FIG. 2 is a side view of a mobile perforating tool storage bank, illustrating storage shelving and perforating gun containers within an interior of the perforating tool storage bank, according to an embodiment.

FIG. 2 illustrates a side view of a mobile perforating storage bank, illustrating storage shelving and perforating gun storage containers within an interior of the perforating storage bank, according to an embodiment. The perforating gun storage containers may include pre-assembled perforating guns that can be singularly or individually accessed from storage containers or boxes within the storage shelves on one side of the mobile perforating storage bank. It is contemplated that that the assembled perforating guns may be of a single configuration, or different sets of assembled perforating guns may include a different assembled configuration. For example, a first configuration may include a single perforating gun, a second configuration may include two perforating guns and a third configuration may include more than two perforating guns. The individual access to each type of perforating gun configuration provides the operator at the wellsite the option of "mix & matching" the gun string configuration in the event that the completion scenario or stage design is amended at short notice.

Figure 3:
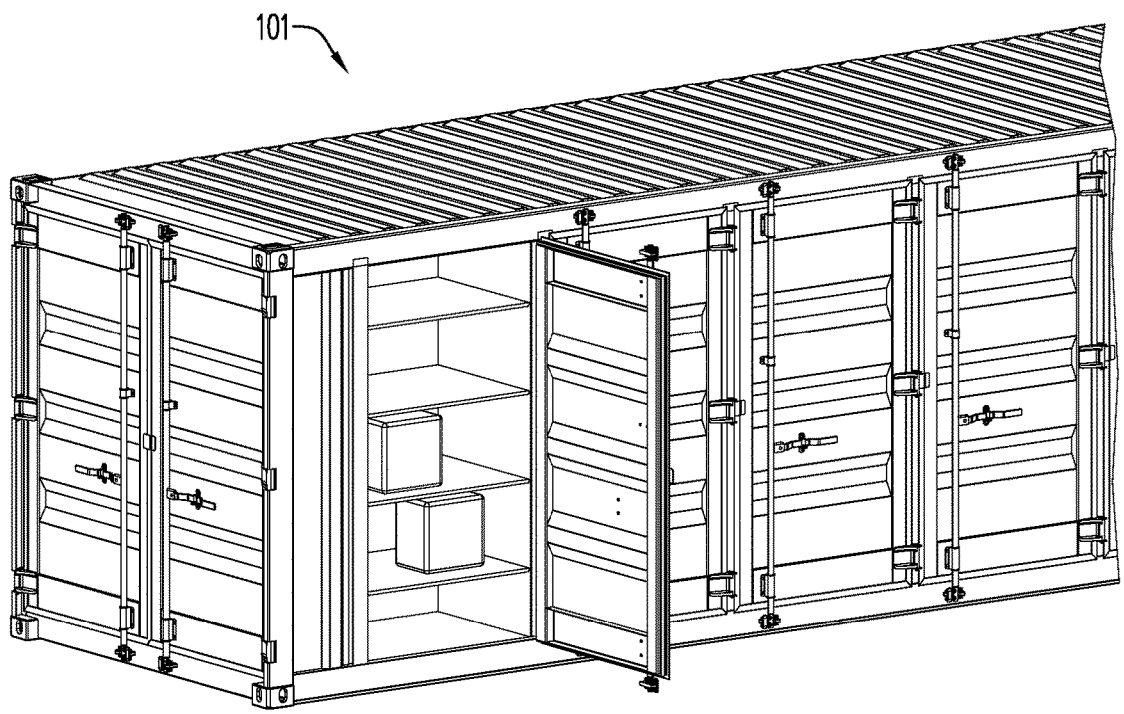
FIG. 3 is a side view a mobile perforating tool storage bank, illustrating separate storage compartments for initiator devices required for a tool-string at a well-site, according to an embodiment.

FIG. 3 illustrates separate storage compartments being positioned in a chamber/interior of the mobile perforating storage bank. The separate storage compartments may be suitable for different forms of initiator devices, which are typically installed in the perforating gun assemblies of tools string when at the well-site. It is contemplated that these separate storage compartments or shelving units will also provide separate storage space for all initiators, detonators, or igniter transport boxes.

Figure 4:
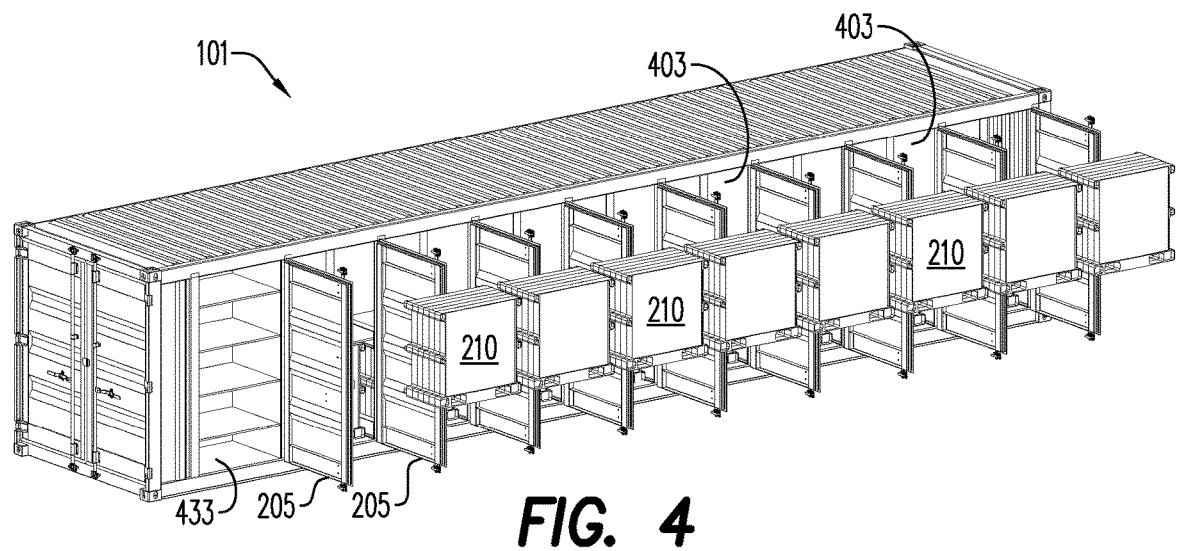
FIG. 4 is a side view a mobile perforating tool storage bank, illustrating the removable storage containers from a shelving unit, according to an embodiment.
Figure 7:
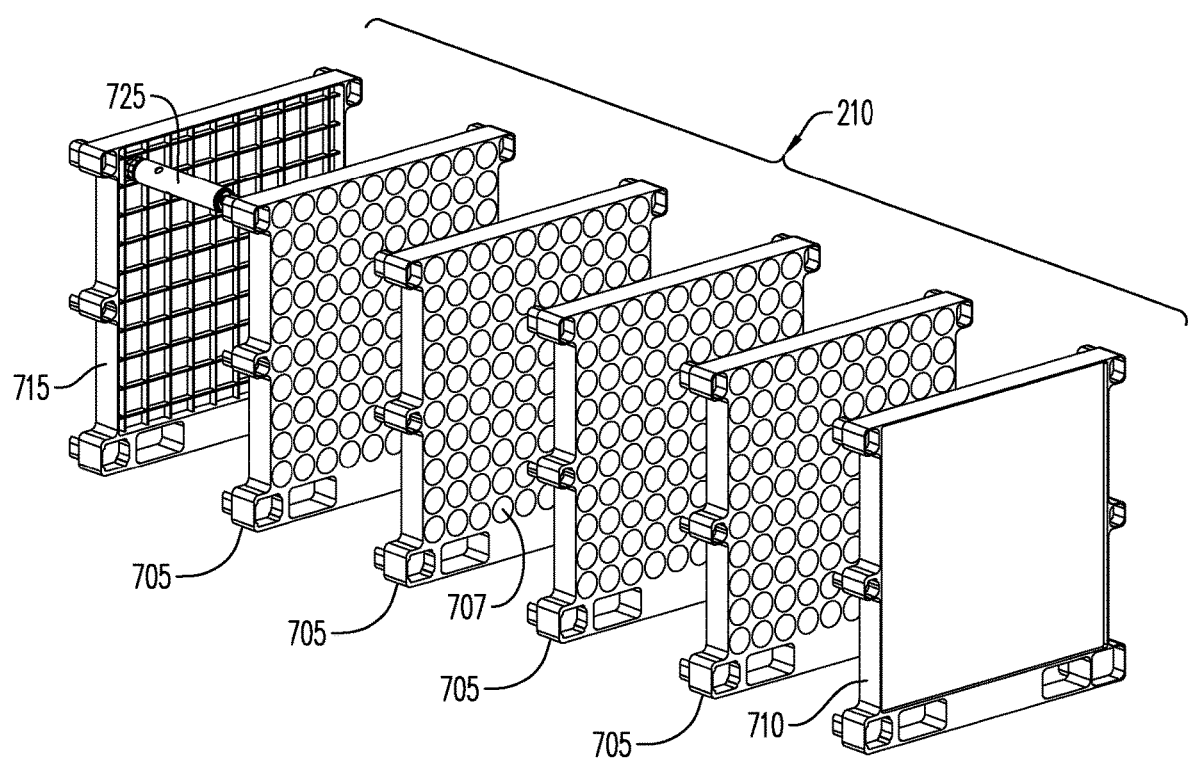
FIG. 7 is an exploded view of a storage containers or boxes for a shelf system positionable in mobile perforating tool storage bank, according to an embodiment.
Figure 8:
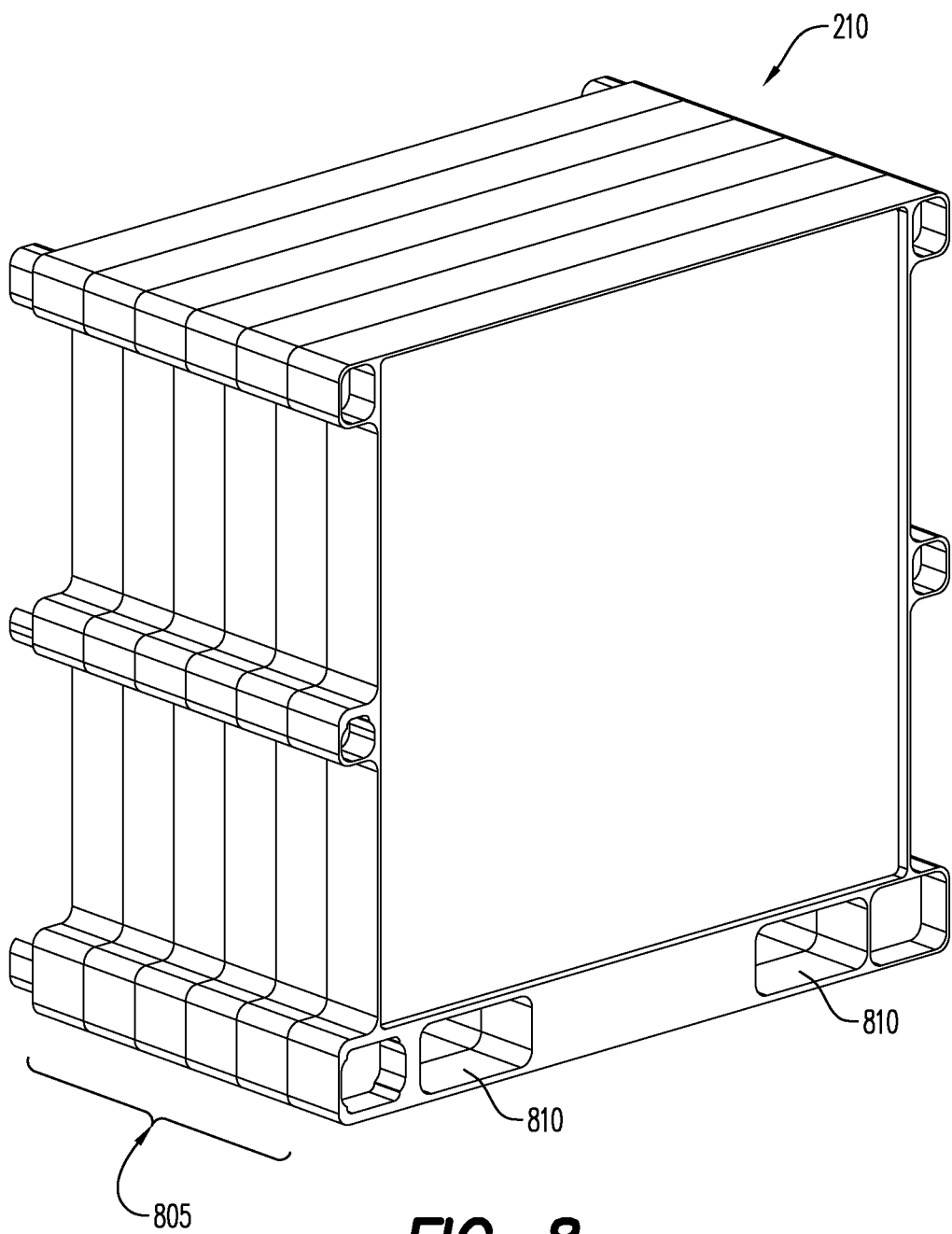
FIG. 8 is a perspective of the storage containers or boxes of FIG. 7.
Figure 9:
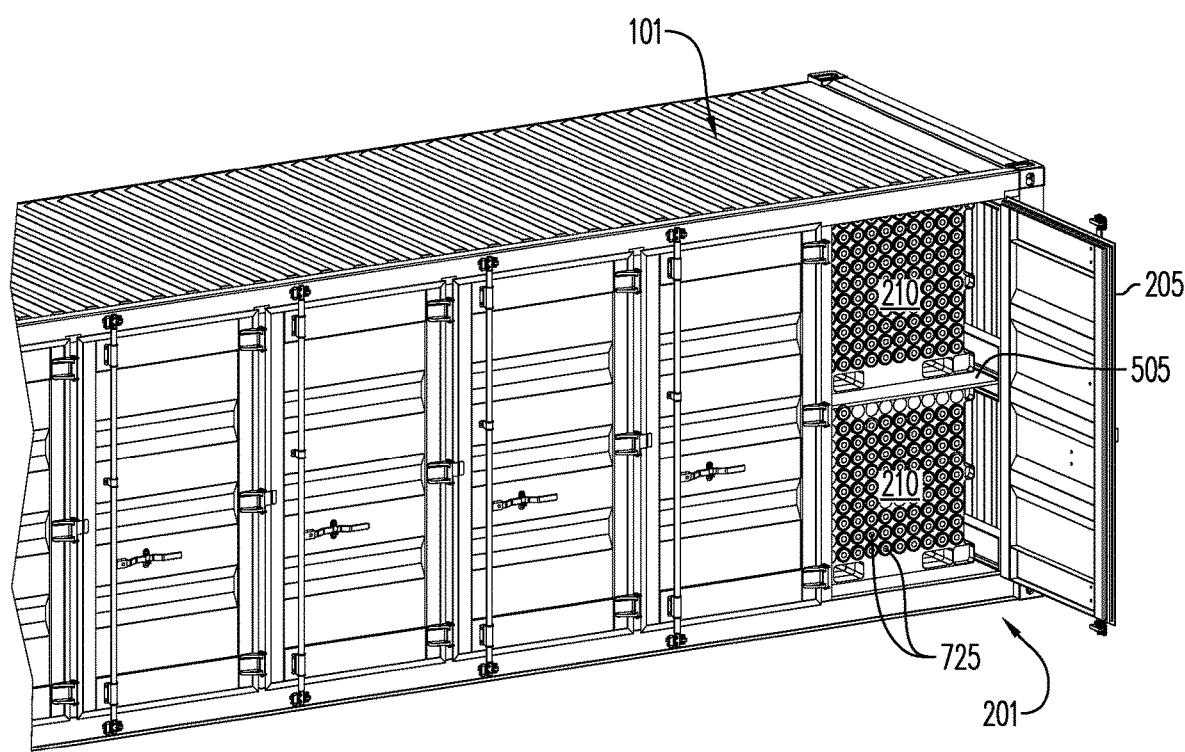
FIG. 9 is a side view a mobile perforating tool storage bank, illustrating perforating gun assemblies positioned in a chamber of the mobile perforating tool storage bank.

FIG. 4, FIG. 7 and FIG. 8 each illustrates an alternate configuration of a storage container. The storage container may be positioned in or removed from the shelving of the mobile perforating storage bank using a forklift or other lifting device. As illustrated in FIG. 7, the storage container may include a plurality of panels having one or more openings extending through each panel of the plurality of panels. The opening may be configured to receive a portion of a perforating gun assembly in the panel and securing the perforating gun assembly in the storage container. FIG. 9 illustrates the storage container including perforating gun assemblies positioned in a chamber of the mobile perforating storage bank. It is contemplated that a panel with no opening (cover panel) to receive a portion of a perforating gun assembly may be positioned on top of the plurality of panels (FIG. 8), which may prevent longitudinal movement of the perforating gun assembly in the storage container. In other embodiments (not shown), rather than the removable storage containers, fixed storage elements may be disposed in the storage bank. For example, the fixed storage elements may have a plurality of pockets with openings, which are configured to hold perforating guns oriented laterally within the storage bank.

Figure 5A:
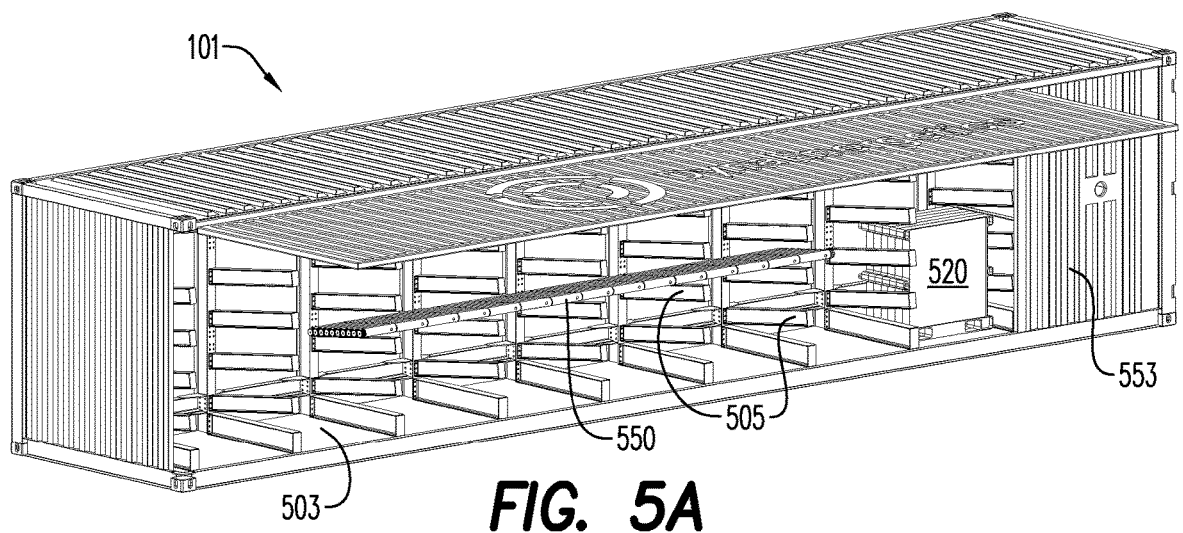
FIG. 5A is a side view a mobile perforating tool storage bank, illustrating a shelving system for receiving used perforating guns or tool strings, according to an embodiment.
Figure 5B:
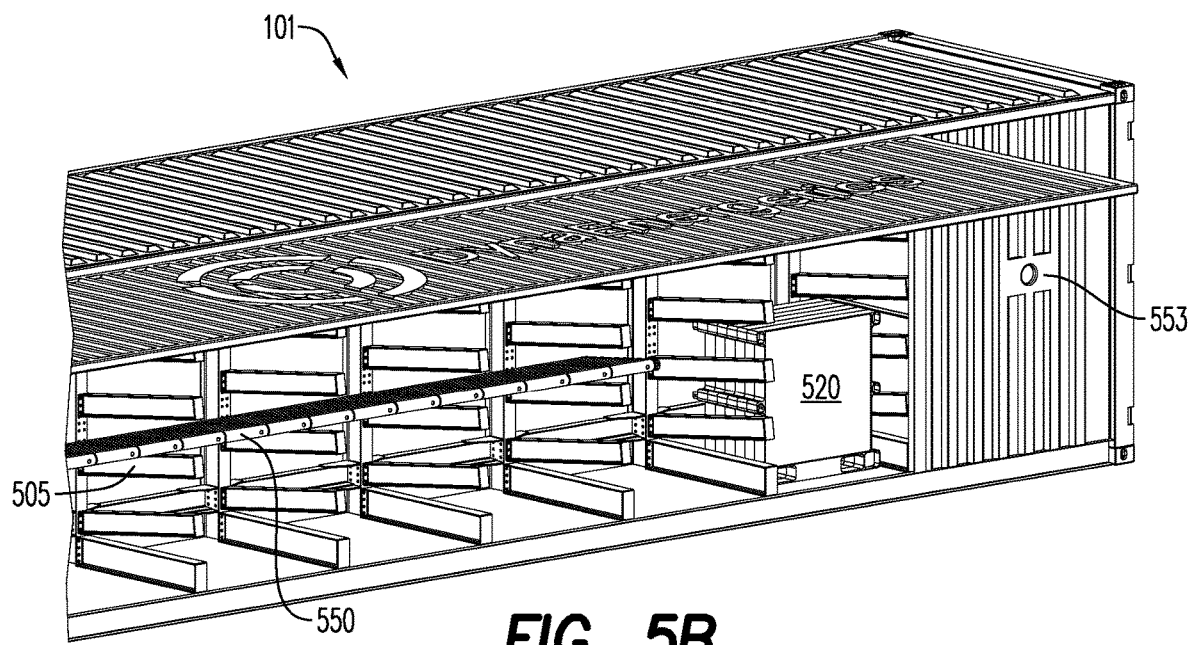
FIG. 5B illustrates perforating guns or tool strings positioned in mobile perforating tool storage bank of FIG. 5B.

FIG. 5A and FIG. 5B illustrates a shelf/shelving system on another side of the mobile perforating storage bank. According to an aspect, the shelf system is an open shelf system. This shelving system may be configured for receiving used perforating guns or entire tool-strings. It is contemplated that it may be configured for receiving and returning used and spent perforating guns and tool string assemblies after they have been retrieved from the wellbore, without the need for "breaking-down" or unscrewing the individual guns at the tandem sub connections. For example, the shelf system may be configured to hold portions of tool strings with a length greater than a single perforating gun and/or greater than the lateral width of the storage bank. This side of the mobile perforating storage bank provides a means to dispose of and recycle the perforating gun assemblies without the requirement for excessive transport crates, packaging, and waste disposal.

One aspect of the perforating storage bank may be capability of receiving, storing, and transporting entire tool strings or, optionally, partially broken-down tool strings which have been used, perforated, and retrieved from the well. The parts or unit of the perforating storage bank which receive the spent or used guns/tool string portions may contain a wet sump or a type of removable trough which is capable of being power-hosed or otherwise purged and cleaned. The used or spent perforating gun strings when placed inside the perforating are mechanically secured in the unit so that they can be safely transported back by road vehicle, to the recycle hub for cleaning, disposal, and/or recycling.

Figure 6:
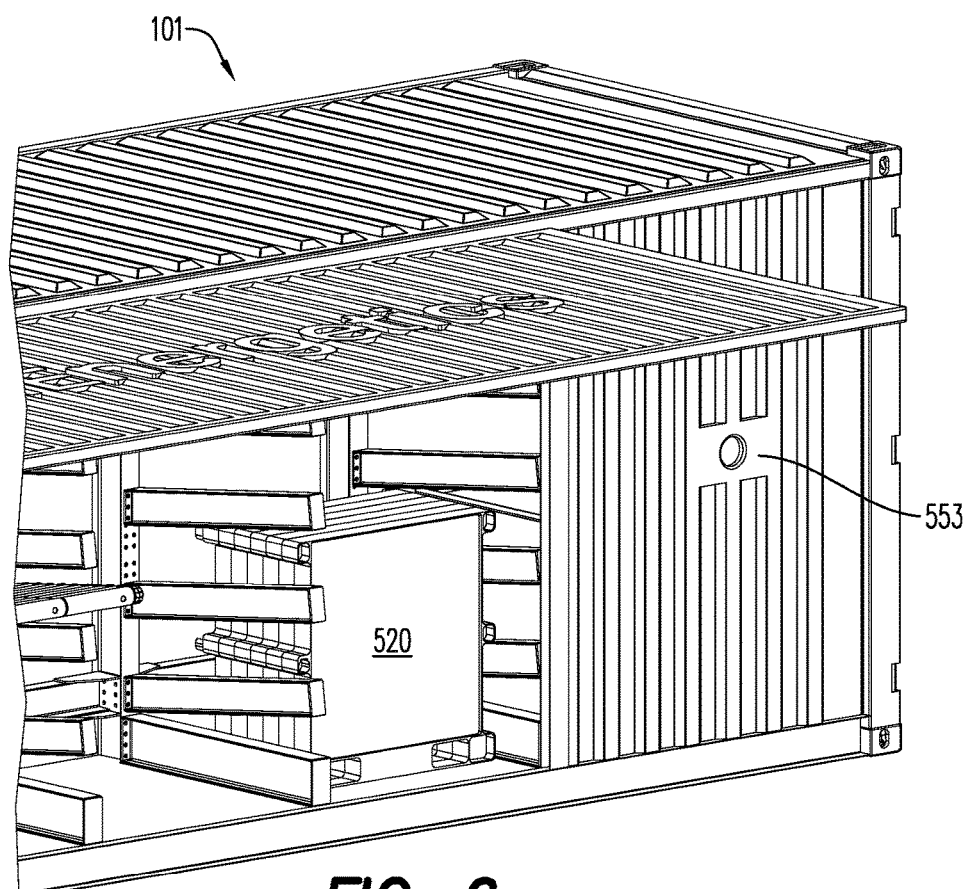
FIG. 6 illustrates a container for storing and returning individual gun assemblies in a mobile perforating tool storage bank, according to an embodiment.

FIG. 6 illustrates a separate compartment or container (illustrated herein as a Red Box®-type container) that is configured for storing and returning individual perforating gun assemblies. These individual perforating gun assemblies may have fired low-order, incorrectly initiated or misfired during deployment. These containers may also be provided for storage and transport in exceptional cases where misfired perforating gun assemblies are retrieved from the wellbore and must be returned to the manufacturer for downloading of explosives and inspection. According to an aspect, these containers are made from composite materials.

It is contemplated that the mobile perforating storage bank may be transported on a standard industry truck or lorry (or in some instances, train) and can be lowered and raised from the truck or trailer, at the wellsite, by means of existing self-contained hydraulic lifting units from the truck. Alternatively, a mobile crane at the wellsite site may be used. In other embodiments, the storage bank could be part of a truck trailer and/or serve as a truck trailer (e.g. with the storage bank having wheels and/or a hitch, which may be integrated therein). The mobile perforating storage bank may be weatherproof against all extreme weather conditions and is structurally secure and robust. For example, the storage bank may include materials that insulate it from weather elements (rain, wind, dust, and the like). The mobile perforating string storage bank may also provide standard electrical sockets and communication outlets for electrical power connections at the wellsite-such electrical connections may be necessary for computer systems and other testing equipment before or after perforating operations are performed.

Figure 10:
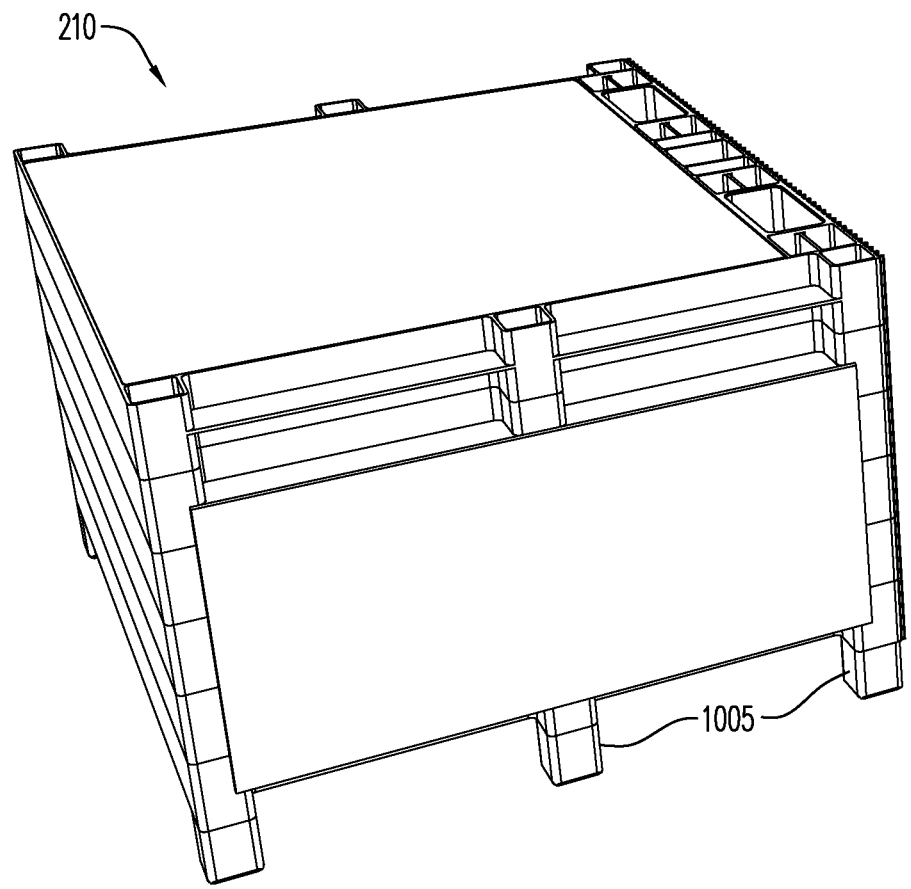
FIG. 10 is a perspective view of a modular storage container in an assembled configuration, according to an aspect.

FIG. 10 is a perspective view of a modular storage container in an assembled configuration, according to an aspect. The modular storage container may be configured to receive and retain tubular components. According to an aspect, the modular storage container is configured to receive and retain tubular wellbore tools, including wellbore tools, and explosive devices such as perforating guns. As illustrated in FIG. 10, for example, the modular storage container may be configured to be in an elevated configuration, via legs on a lower (bottom or first outer) panel of the storage container. In some embodiments, the legs may be integral to a panel (e.g. a lower panel), while in other embodiments the legs may be removably attached to the panel. The legs may be made of plastic (injection molded with the panel) or may be separately attached leg made of the same plastic, another plastic, or metal. The elevated configuration of the assembled modular storage container may enable and/or assist a user to move the modular storage container from one location to another location using, for example, a forklift. The container may be able to hold over 100 pounds. According to an aspect, the storage container (including about 6 fixation panels) may be configured to hold up to about 160 pounds.

Figure 11:
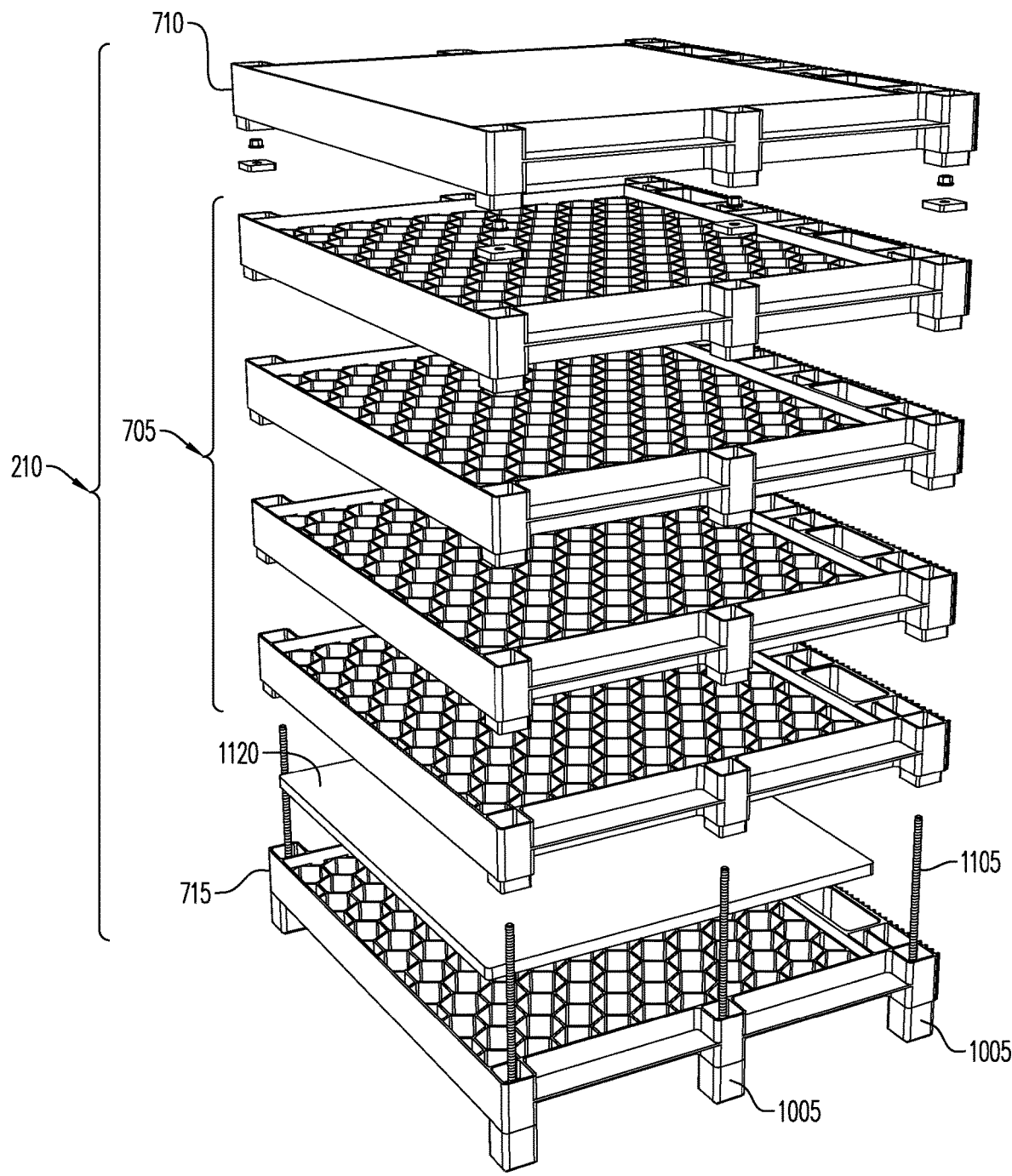
FIG. 11 is an exploded view of the modular storage container of FIG. 10.

FIG. 11 is an exploded view of the modular storage container of FIG. 10. The modular storage container includes a plurality of panels. According to an aspect, the plurality of panels includes the lower (e.g. base outer) panel, a fixation panel (inner panel), and an upper (cover or second outer) panel. According to an aspect, each panel of the modular storage container is formed of polyamide or hard plastic material. According to an aspect, the panels are made from recycled plastics. It is contemplated that the panels may be injection molded. Each panel may be able to be coupled with another panel (which may be identical) so that the size (e.g. height) and configuration of the modular storage container can be changed according to the needs of the user. It is contemplated that each panel of the plurality of panels is reusable. If one panel of the container is damaged, only the layer with the damage would need to be removed or replaced.

One or more plates may be positioned in between the lower panel and the adjacent fixation panel to help secure the contents of the module storage container, and provide a stabilization surface. The plates may be formed from a wooden material, a composite material, or any other material that is rigid and able to withstand the weight of the tubular components. While it may not be required, it is contemplated that a plate may be positioned between the upper panel and the adjacent fixation panel—the surface of the plate may help to provide an additional surface between which the tubular components may be sandwiched. The plate may be configured to create a bottom for the tubular devices in the modular storage container.

Figure 12:
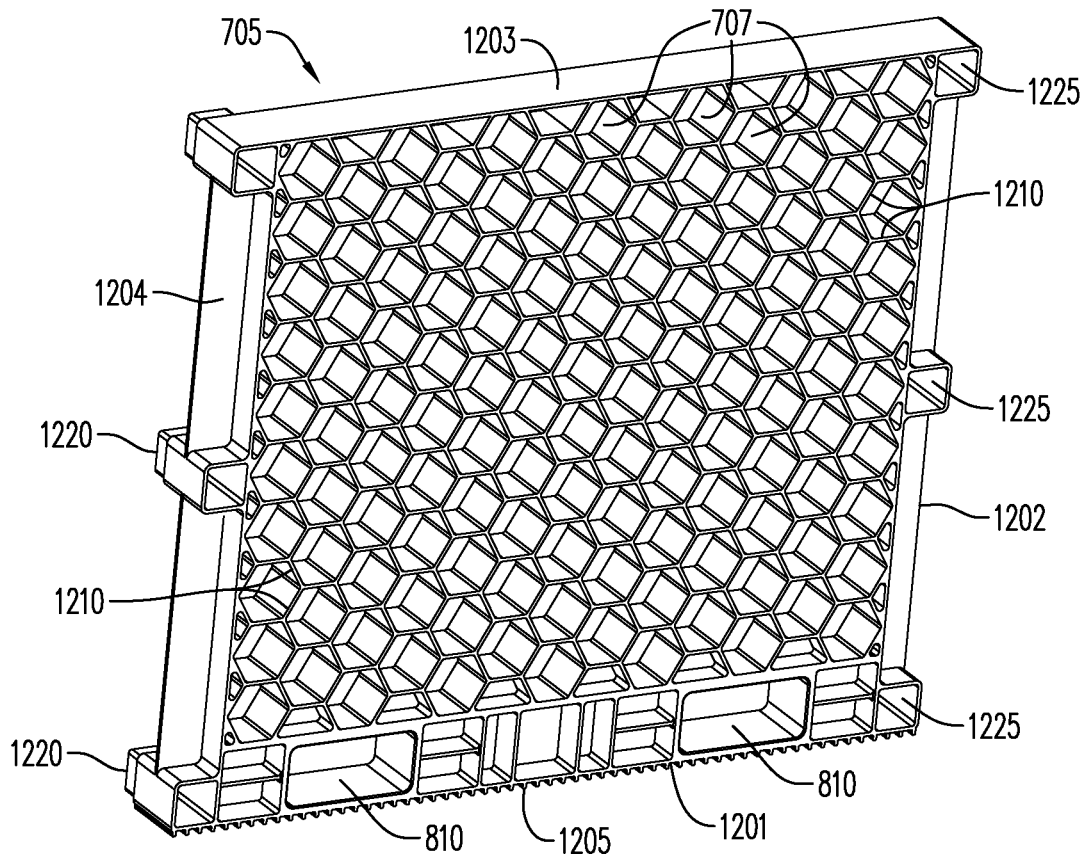
FIG. 12 is a perspective view of a panel of a modular storage container, according to an aspect.

FIG. 12 provides a more detailed view of the fixation panel. The fixation panel includes a plurality of sidewalls (such as, first, second, third and fourth sidewalls). Two of more of the sidewalls include a receptacle that provides a passage for rods to extend through and secure/fixate the panels together. The rods may be used to connect all of the panels together, with bolts on the top panel, for example, to secure all the panels together. According to an aspect, a square or rectangular shaped washer may fit in a receptacle (socket) formed in the top panel, and the rod may be disposed therethrough. The rods may help to stabilize and/or mechanically secure the panels, plate/(s) and/or tubular devices of the modular storage container. According to an aspect, one end of the receptacle includes a protrusion (pin), having an outer diameter that is less than an inner diameter of the receptacle. When a plurality of fixation panels are arranged on top of another, the protrusions of a first fixation panel are received in the receptacle of a second fixation panel. By stacking multiple layers of panels on top of each other the desired stack height for every tubular device (such as, for example, the length of a perforating gun) can be produced.

At least one sidewall of the plurality of sidewalls may also be configured with appropriately spaced apart forklift holes or slots arranged to receive the forks of a forklift. An outer surface of that sidewall may have a frictional (e.g. grip) surface to ensure that the assembled modular storage container does not move (ex: slide) when positioned on a surface. The frictional surface may include a ridged profile or structures to help aid in the lifting and transport of the fully loaded modular storage container.

As illustrated in FIG. 12, the fixation panel includes a plurality of openings extending therethrough. The fixation panel is configured to receive and retain the tubular device in the opening, such as a wellbore tool. While openings are illustrated as having a hexagonal shape, it is contemplated that the openings may be of any other shape such as circular, triangular, rectangular, and the like.

Figure 13:
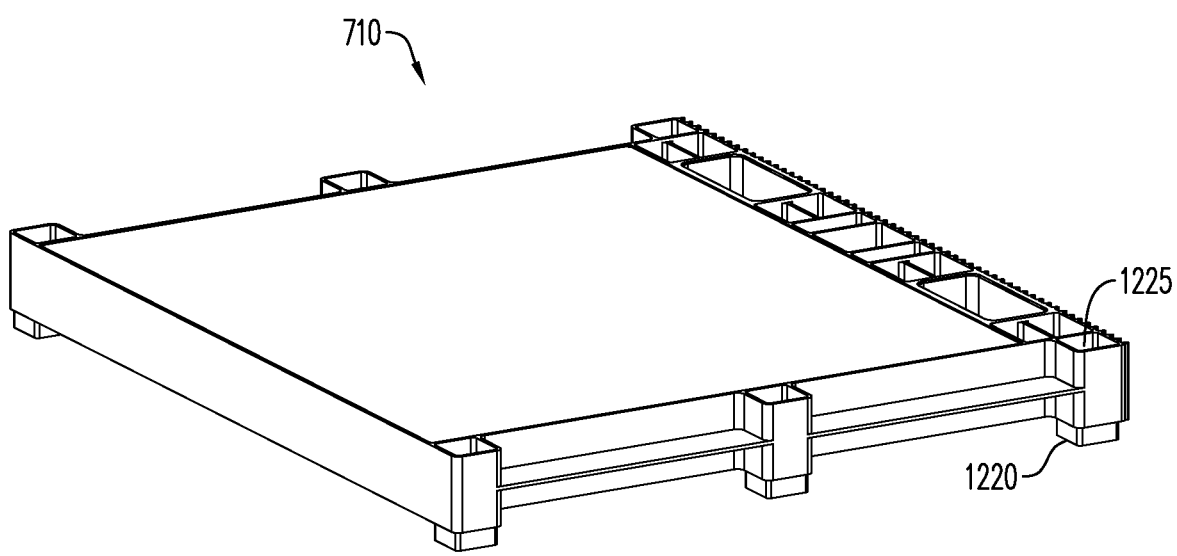
FIG. 13 is a top, perspective view of a top panel of a modular storage container, according to an aspect.

FIG. 13 is a top, perspective view of a top panel of a modular storage container, according to an aspect. The upper panel may include the aforementioned forklift holes on a side wall (not shown). The top panel includes a planar surface, and is configured cover the tubular devices, such as perforating guns, in place during transport. In some embodiments, the panels (e.g. of a specific storage container) may all be sized and shaped identically, so that when stacked the sidewalls are flush.

Figure 14:
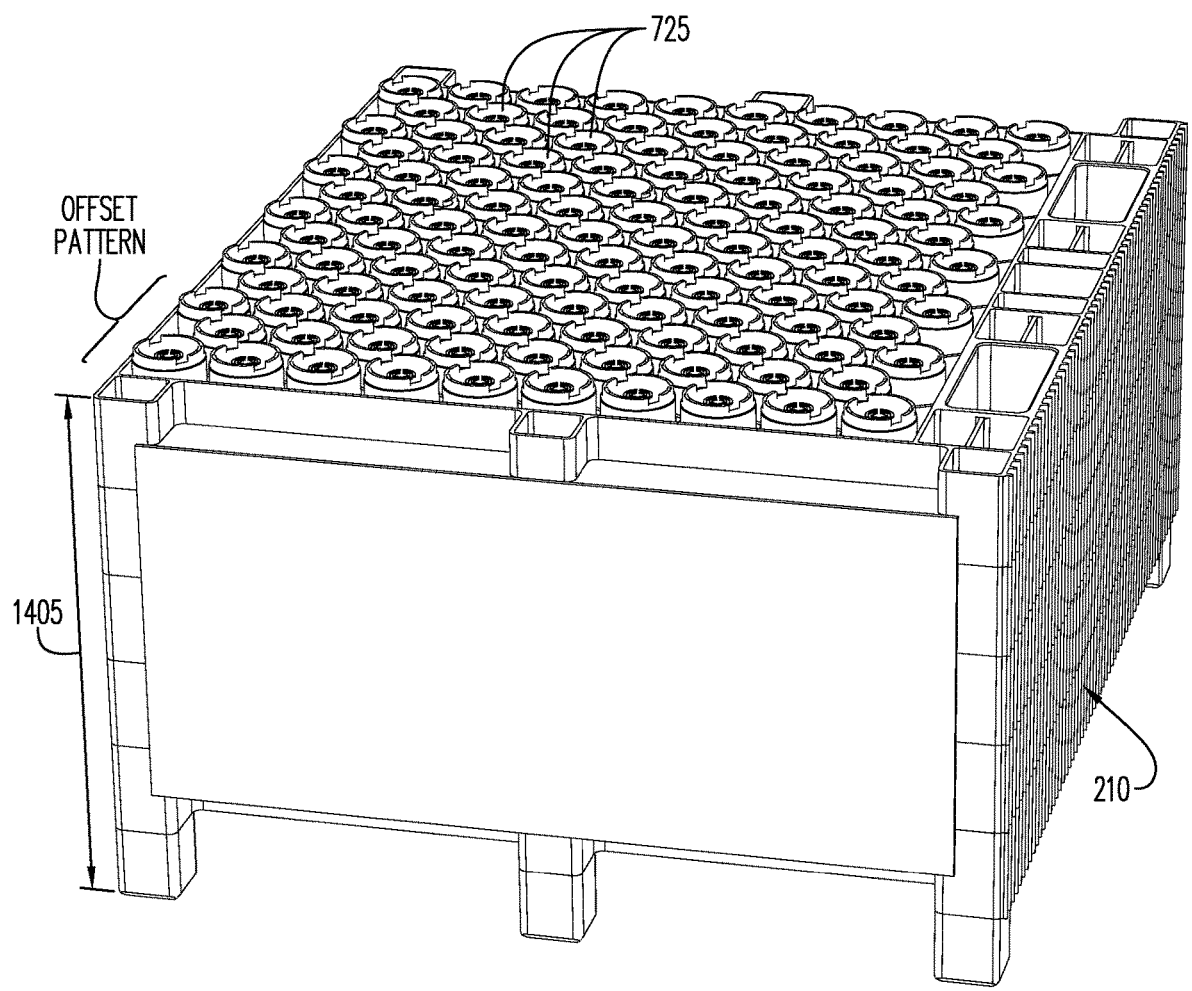
FIG. 14 is a perspective view of a modular storage container in an assembled configuration and including a plurality of explosive devices, according to an aspect.

FIG. 14 is a perspective view of a modular storage container in an assembled configuration and including a plurality of explosive devices. As illustrated in FIG. 14, the tubular devices may be arranged in an offset pattern, as a result of the openings being configured in an offset pattern through the fixation panel, and in some configurations the lower panel. This beehive type configuration may help to ensure that the space for receiving the tubular devices is maximized (i.e., the space is used more efficiently).

Figure 15:
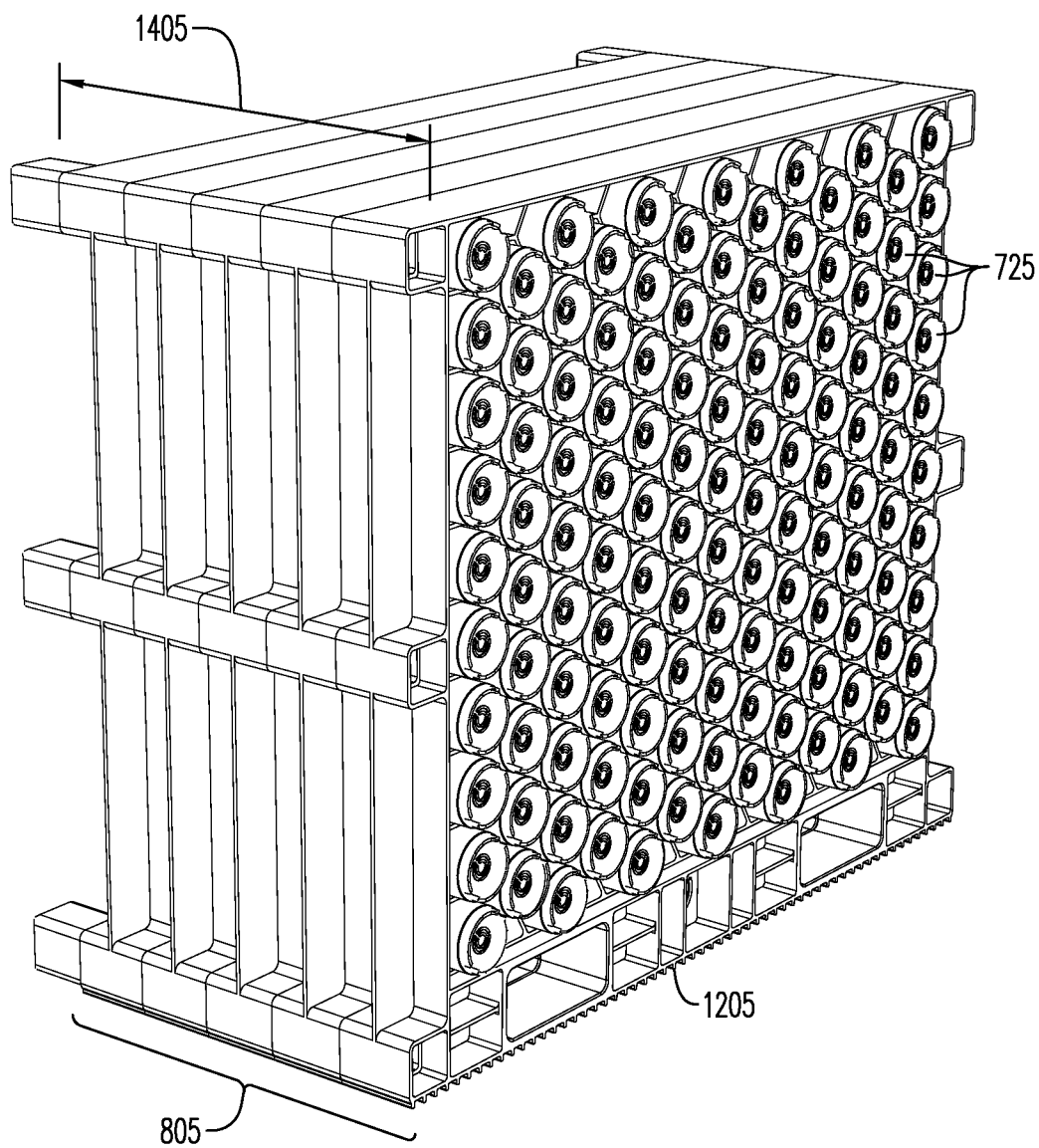
FIG. 15 is a perspective view of the modular storage container of FIG. 14 on its side, according to an aspect.

FIG. 15 is a perspective view of the modular storage container of FIG. 14 on its side, according to an aspect. As illustrated the modular storage container is being frictionally engaged with a ground surface.

Figure 16:
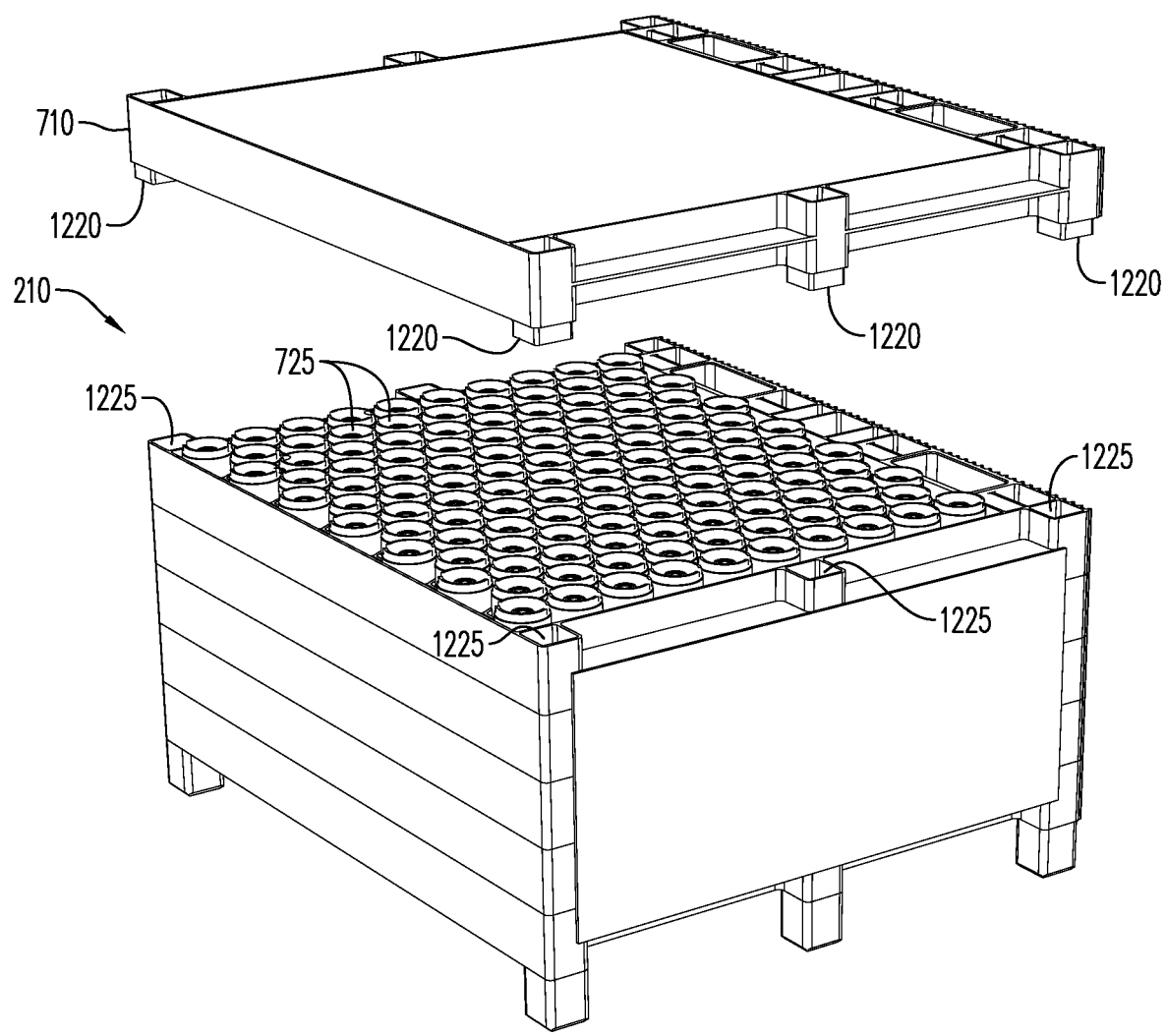
FIG. 16 is a perspective view of the modular storage container of FIG. 14, with a top panel for being disposed in a covering relationship with a plurality of explosive devices.

FIG. 16 is a perspective view of the modular storage container of FIG. 14, with a top/cover panel for being disposed in a covering relationship with a plurality of tubular devices. The protrusions of the top/cover panel are receivable in the receptacles of the uppermost fixation panel. It is contemplated that modular storage container may provide uniformity in the packing and shipping of tubular devices, such as wellbore tools. In other words, perforating gun assemblies can always be packed in the same way. In addition, the reusability of the modular storage container results in reduction of waste.

It is further contemplated that a robotic system may be utilized to pack the modular storage container. The robotic system may be configured as a pick and place system. No matter how long a perforating gun string may be, the robotic system may facilitate automatic loading of the modular storage container.

Figure 17:
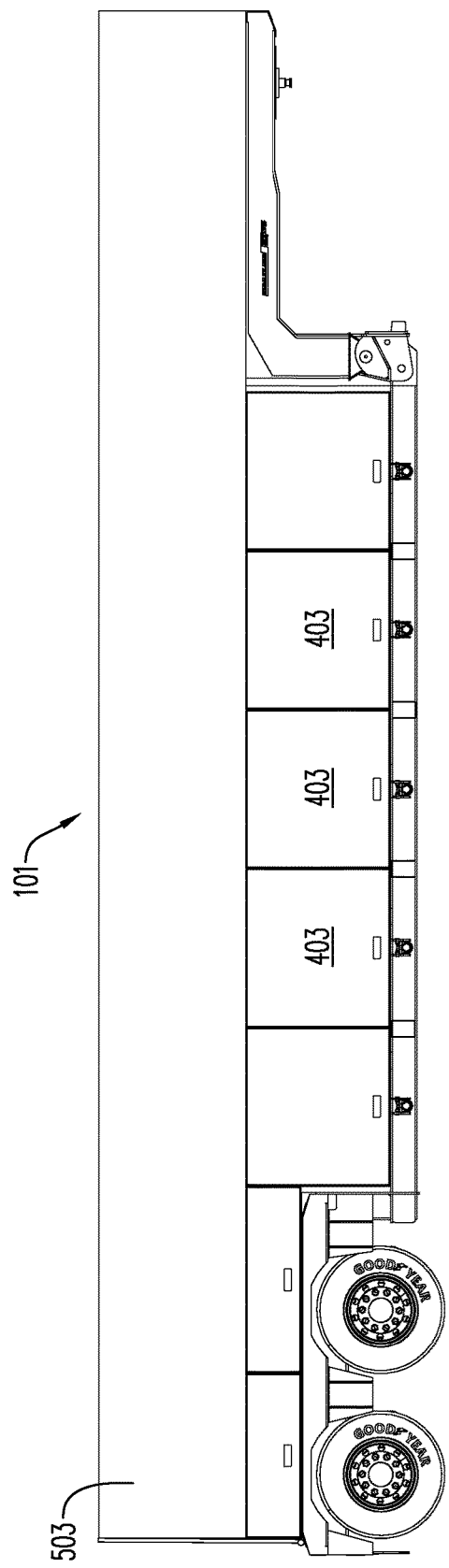
FIG. 17 is a side view of a mobile explosive storage bank including a plurality of storage chambers, according to an aspect.
Figure 18:
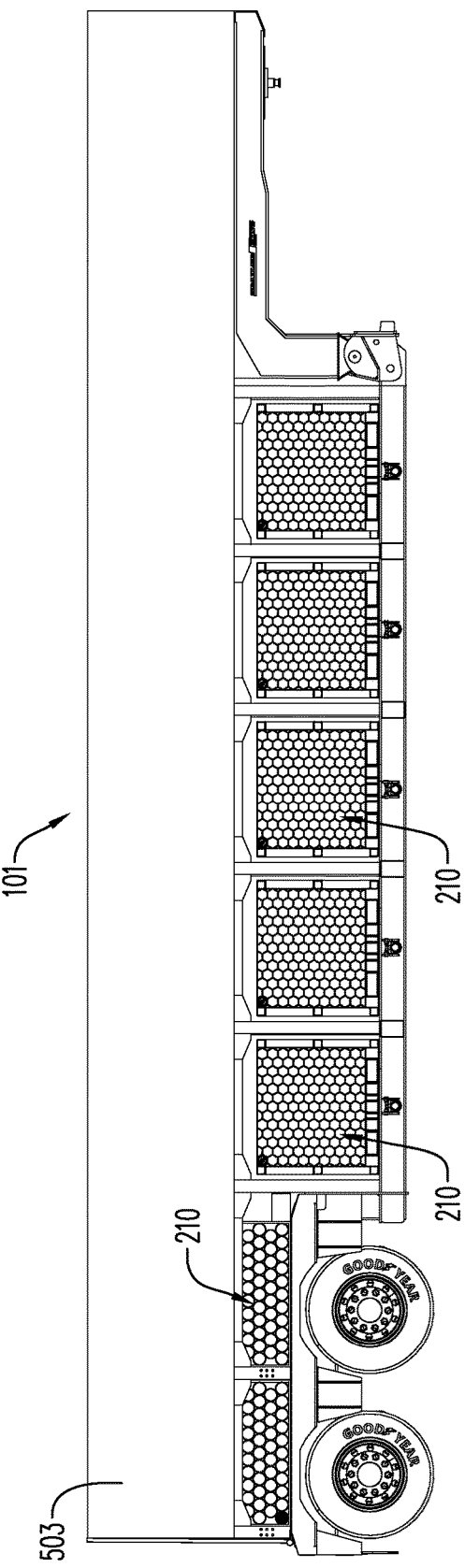
FIG. 18 is a side view of a mobile explosive storage bank, illustrating a plurality of modular storage containers positioned in a plurality of storage chambers, according to an aspect.

It is contemplated that the modular storage containers may be positioned in a mobile explosive/perforating storage bank. As illustrated in FIG. 17, the mobile explosive storage bank includes an upper portion and a lower portion. A plurality of storage chambers/compartments is provided in the embodiment shown in FIG. 17. According to an aspect, the storage chambers may be disposed at the upper portion or the lower portion. As illustrated in FIG. 18, a plurality of modular storage containers is arranged in the mobile explosive storage bank. The storage containers to the rear of the bank are of a lesser size, while the storage containers to the front of the bank are larger.

FIG. 19 and FIG. 20 both illustrate the mobile explosive storage bank including a plurality of storage chamber disposed at the upper portion of the storage bank. The storage chambers may include a shelving system (FIG. 19) or may be a receptacle that receives any component of wellbore tools. According to an aspect, the upper storage chambers may be disposed at the front portion of the storage bank. In some embodiments, the upper portion/upper storage chamber may extend further forward than the bottom portion.

Figure 21:
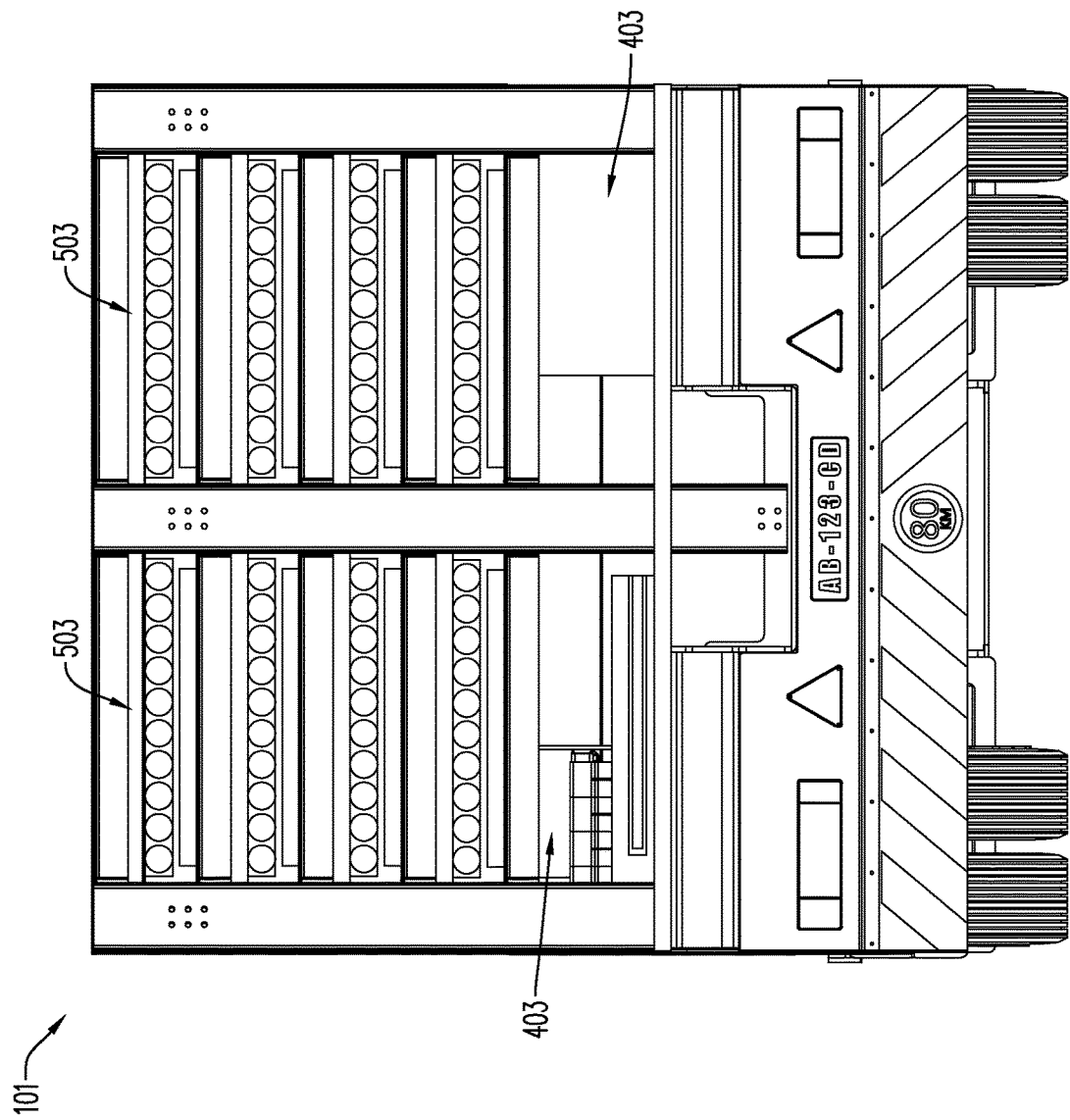
FIG. 21 is a schematic rear view of a mobile explosive storage bank, according to an aspect.

FIG. 21 is a rear view of a mobile explosive storage bank. According to an aspect, the storage bank may include segments that create different compartments for receiving tubular structures (ex: string of perforating guns) or other wellbore tools. According to an aspect, the storage bank includes a two-side (first side and second side) loading configuration to help to balance the weight in the mobile explosive storage bank.

Figure 22:
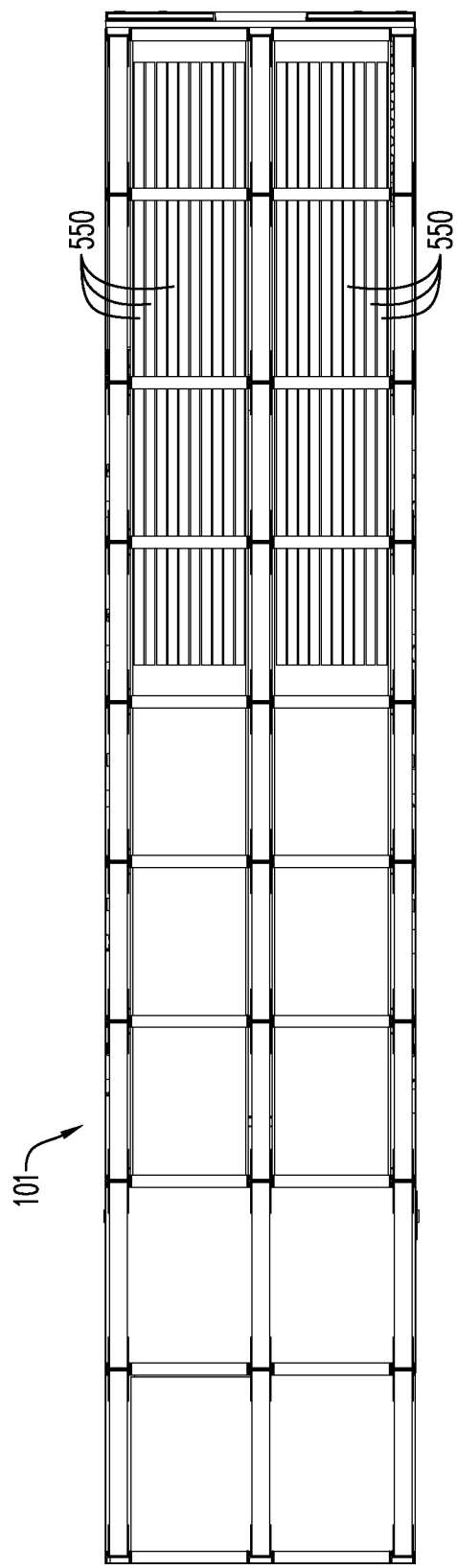
FIG. 22 is schematic a top view of a mobile explosive storage bank, illustrating a plurality of connected perforating gun assemblies positioned therein, according to an aspect.

FIG. 22 is a top view of a mobile explosive storage bank. As illustrated, a plurality of tubular devices is positioned therein. The tubular devices may include a string of perforating guns. The tubular devices may be positioned on a friction reduction plate. According to an aspect, the tubular devices may be secured in the bank by any securing mechanisms to ensure the tubular devices do not move around substantially in the bank. According to an aspect, the plurality to storage devices may be spent (or used) perforating guns, which have no active detonator or explosives in them. It is contemplated that the mobile explosive storage bank, with or without modular storage containers, has no effect on the DOT transporting specification of dangerous goods or licensing.

It is contemplated that the storage containers in the mobile perforating storage bank are made from re-usable materials, and the system is environmentally beneficial as it completely removes or reduces all packaging material, which is usually thrown away, to an absolute minimum.

Returning now to the Figures in more detail, embodiments may relate to devices for storing and/or transporting tubular structures 725, such as perforating guns or perforating gun assemblies. For example, each tubular structure 725 (e.g. perforation gun or perforating gun assembly) may have a length less than a half (½), a third (⅓), or a quarter (¼) a lateral width of a storage bank 101 (e.g. from ¼ to ½ or from ⅓ to ½ the lateral width of the storage bank) in which the modular storage container 210 holding the tubular structures 725 may be disposed. The tubular structures 725 may have a diameter of about 2¾ to 3½ inches (e.g. 2¾ inch outer diameter, 3½ inch outer diameter, or 3⅛ inch outer diameter). In some embodiments, each tubular structure 725 (e.g. in a storage container 210) may be or include a perforating gun 2301 having at least one shaped charge 2307

Figure 23:
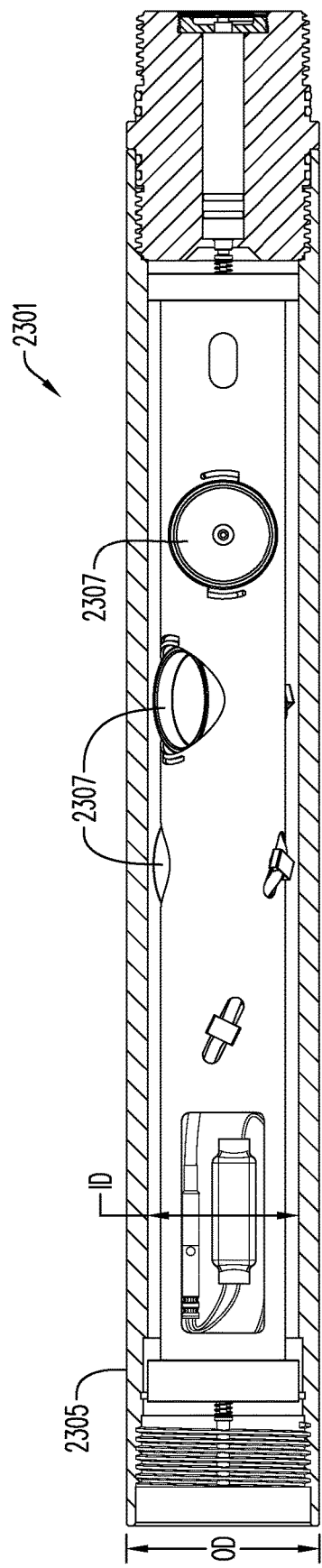
FIG. 23 is a cross-section view of an exemplary perforating gun, according to an aspect.
Figure 24:
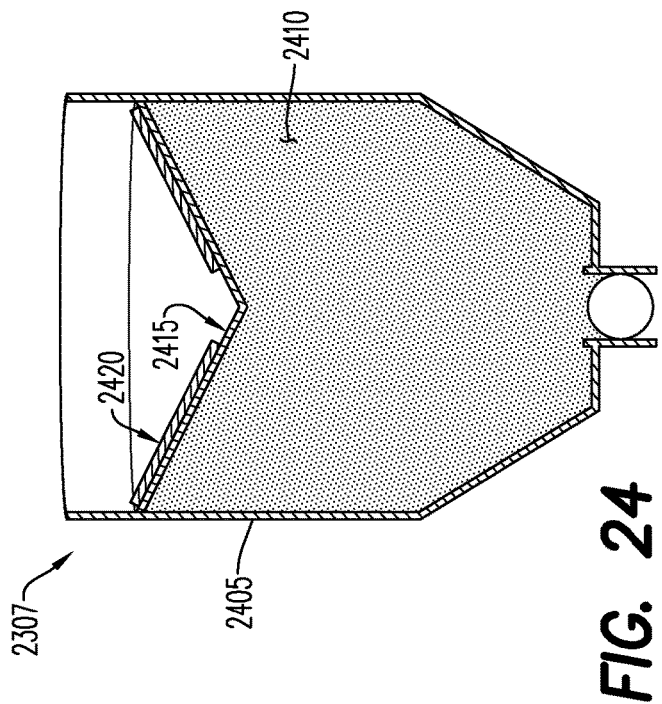
FIG. 24 is a cross-section view of an exemplary shaped charge, according to an aspect.

(see for example, FIG. 23). For example, the shaped charge 2307 may be configured or oriented in the perforating gun (e.g. within the perforating gun housing 2305) to fire radially outward. In some embodiments, the shaped charge 2307 may include a case 2405 having a recess, explosive material 2410 disposed in the recess, and a liner 2415 disposed atop the explosive material 2410 (e.g. with the explosive material disposed between the case and the liner). Some shaped charge embodiments may further include an inlay 2420 disposed atop at least a portion of the liner 2415 (e.g. with the liner disposed between the inlay and the explosive material). See for example, FIG. 24. Further exemplary details regarding exemplary perforating guns and/or shaped charges are described in U.S. patent application Ser. No. 17/383,816, filed Jul. 23, 2021, which is hereby incorporated by reference in its entirety to the extent that it is not inconsistent and/or incompatible with this disclosure. The modular storage container 210 and/or storage bank 101 may be configured to allow for secure and safe storage and/or transport of the tubular structures 725 (e.g. perforating guns and/or perforating gun assemblies).

FIGS. 7-8, 10-11, and 14-16 illustrate exemplary embodiments of a modular storage container 210 for a plurality of tubular structures 725. By way of example, the tubular structures 725 may comprise or may be perforating guns or perforating gun assemblies. The modular storage 210 container may include a plurality of fixation panels 705, which jointly may be used to form the modular storage container 210. For example, a stack 805 of fixation panels 705 may be attached together to form the modular storage container 210. Embodiments of the stack 805 of fixation panels may have each fixation panel 705 contacting one or more adjacent fixation panels 705 (e.g. all of the adjacently stacked fixation panels may be contacting).

As shown in FIG. 12, each fixation panel 705 may include a plurality of openings 707 therethrough each configured for receiving, retaining, supporting, separating, and/or bounding a portion of one of the plurality of tubular structures 725, with the plurality of fixation panels 705 configured to be used together with aligned openings 707 to retain/support the tubular structures 725 (e.g. encompassing/enclosing the tubular structures 725 along at least a portion of their length). Each of the openings 707 may extend through a planar face of the fixation panel 705 (e.g. from a first planar surface to a second planar surface). Each of the openings 707 in a fixation panel 705 may be surrounded by a plurality of struts 1210, which may help to limit lateral movement of tubular structures 725 disposed in the openings 707. According to an aspect, the plurality of struts 1210 may jointly form a grid of openings 707.

In some embodiments, each fixation panel 705 includes a first sidewall 1201, a second sidewall 1202, a third sidewall 1203, and a fourth sidewall 1204, which jointly form a perimeter of the fixation panel 705. The perimeter surrounds/encompasses the grid of openings 707 (e.g. the planar face in which the openings 707 are disposed), with the plurality of struts 1210 disposed within the perimeter to form the plurality of openings 707 disposed within the perimeter. In some embodiments, the planar face of each fixation panel 705 may be a quadrilateral in shape (e.g. rectangular or square), which may be bounded on its perimeter by the sidewalls. In some embodiments, the grid of openings 707 for each fixation panel 705 may have about 100 to about 120 openings (e.g. so that storage containers 210 formed of stacks 805 of fixation panels 705 may be configured to house about 100 to about 120 tubular structures 725). FIG. 12 illustrates an exemplary fixation panel 705.

In some embodiments, when the fixation panels 705 are stacked, the first sidewalls 1201 of all of the fixation panels 705 are aligned (e.g. in the same plane), the second sidewall 1202 of all of the fixation panels 705 are aligned (e.g. in the same plane), the third sidewalls 1203 of all of the fixation panels 705 are aligned (e.g. in the same plane), and the fourth sidewalls 1204 of all of the fixation panels 705 are aligned (e.g. in the same plane). In some embodiments, the first sidewalls 1201 of all fixation panels 705 in the stack 805 may be flush (e.g. to form a first side of the storage container 210), the second sidewalls 1202 of all fixation panels 705 in the stack 805 may be flush (e.g. to form a second side of the storage container 210), the third sidewalls 1203 of all fixation panels 705 in the stack 805 may be flush (e.g. to form a third side of the storage container 210), and the fourth sidewalls 1204 of all fixation panels 705 in the stack 805 may be flush (e.g. to form a fourth side of the storage container 210). In some embodiments, when the fixation panels 705 are stacked, the aligned openings in the stack 805 of fixation panels may form pockets configured to retain, support, enclose, and/or encompass the tubular structures 725 disposed therein along at least a portion of their length (and in some embodiments, along their entire length). For example, the storage container 210 may have a grid of pockets (e.g. which may be formed by alignment of corresponding openings in the plurality of fixation panels). As used herein, struts 1210 may refer to or include separator walls which may form the openings 707 and/or the grid of openings 707, serve to separate each of the tubular structures 725 from the remaining tubular structures, support the tubular structures within the grid of openings, provide shock-absorbing retention of the tubular structures 725, and/or support and/or provide structure to the panel (e.g. jointly supporting the sidewalls).

In some embodiments, each of the openings 707 may be circular, square, hexagonal, triangular, etc. For example, all of the openings 707 in the fixation panels 705 for a specific modular storage container 210 may be substantially the same shape and size (e.g. based on the outer diameter of the tubular structures to be held therein). The openings 707 may be configured for snug fit of the tubular structure 725 therein to limit lateral movement of the tubular structure 725 within the pocket, while allowing longitudinal sliding of the tubular structure 725 within the pocket (e.g. to load and remove the tubular structures with respect to the pockets). For example, each opening 707 may be configured with a diameter that is approximately 2-6 mm (e.g. 4 mm) greater than the outer diameter of the tubular structure 725 to be held therein. In some embodiments, the openings 707 may be oriented in each fixation panel 705 in a honeycomb pattern of openings. For example, the openings 707 may be oriented in staggered rows (e.g. with rows offset), as shown in FIG. 12. As described herein, the offset rows may help to ensure that the space for receiving tubular structures is maximized. Each fixation panel 705 has a thickness (e.g. of the sidewalls and/or the struts), and typically the thickness is no more than a half (½), a third (⅓), a fourth (¼), a sixth (⅙), an eighth (⅛), or a tenth (⅒) of a length of the tubular structure 725 (e.g. between ⅓ and ⅛ or between ¼ and ⅙ the length of the tubular structures). The thickness of the fixation panel 705 in FIG. 12 is less than the length of the sidewalls. In some embodiments, the fixation panels 705 (e.g. struts and sidewalls) may be formed of polyamide or a hard plastic material. In some embodiments, the struts 1210 and sidewalls 1201, 1202, 1203, 1204 may be integrally formed (e.g. molded as a single integral unit). In some embodiments, at least one of the sidewalls (e.g. the first sidewall 1201) of each fixation panel 705 may include forklift slots 810. In some embodiments, at least one of the sidewalls (e.g. the first sidewall 1201) may have an anti-skid (e.g. high-friction) grip surface 1205. In some embodiments, the grip surface 1205 and the forklift slots 810 may be located with respect to the same sidewall (e.g. the first sidewall 1201).

In some embodiments, the plurality of fixation panels 705 may be configured to be stacked adjacent each other with openings 707 aligned to form pockets configured to encompass the tubular structures 725. For example, corresponding openings 707 in adjacent fixation panels 705 (e.g. in all of the fixation panels 705 of the stack) may align (e.g. to form pockets extending through the modular storage container 210). Each pocket may be configured to encompass/hold/retain a single tubular structure 725, for example along its entire length, and the longitudinal axis of each tubular structure 725 may be parallel to the longitudinal axis of the corresponding pocket and may extend through aligned openings 707 of the stack 805 of fixation panels 705. Each pocket may have divider walls (e.g. formed by stacked struts 1210 of stacked fixation panels 705) surrounding and separating each tubular structure 725 from the other tubular structures held in the modular storage container 210. Each of the openings 707 in a fixation panel 705 may be surrounded by struts 1210 and form a grid of openings 707. Typically, the openings 707 of the grid may have a diameter slightly greater than the diameter of the tubular structures 725, for example to provide a snug fit to prevent significant/substantial non-longitudinal movement/rattling. The struts 1210 of stacked fixture panels 705 may jointly form the divider walls forming the pockets. In some embodiments, the pockets formed by the stacked fixation panels 705 may be configured so that each tubular structure 725 held in the modular storage container 210 is individually accessible and removable from its pocket (e.g. via the openings in the end of the pocket).

In some embodiments, all of the fixation panels 705 in a stack 805 forming a modular storage container 210 may be identical. In other embodiments, while there may be variations between fixation panels 705, at least the grid of openings 707 in the fixation panels 705 may be identical to allow for stacking of panels to align openings to form the pockets. In some embodiments, at least some of the openings 707 of adjacent fixation panels 705 may align to form pockets. In some embodiments, each modular storage container 210 may include at least 4, at least 5, at least 6, no more than 6, no more than 8, and/or no more than 10 fixation panels 705 (e.g. in the stack 805 of panels).

As shown in FIGS. 8, 10, and 14-16, the plurality of fixture panels 705 may be configured to be removably attached together in a stack 805 to form the modular storage container 210 (e.g. which may have solid external walls, as shown in FIG. 8 for example). As shown in FIG. 11, an attachment device may be configured to removably attach the plurality of fixation panels 705 in stacked arrangement. For example, rods 1105 or bolts may be configured for screw (e.g. thread) attachment with a complementary receiver (e.g. in a fixation panel or end panel or separate nut). In some embodiments, the rods 1105 may include threading, which may correspond to the complementary receiver (e.g. nut). In some embodiments, the threading may extend the entire length of the rod 1105, while in other embodiments, the threading may only be disposed on a portion of the rod.

Some modular storage container 210 embodiments may further include end panels, each configured to the stacked adjacent a fixation panel 705 (e.g. on one side/face). For example, one end panel (e.g. a cover end panel 710) may be stacked adjacent a top fixation panel of the stack 805, and one end panel (e.g. a base end panel 715) may be stacked adjacent a bottom fixation panel of the stack 805. Each end panel may be configured to prevent longitudinal movement of the tubular structures 725. For example, each end panel may have a solid face and/or may have a face surface without openings corresponding to the openings 707 in the fixation panels 705 (e.g. with some element spanning the openings 707 in the adjacent fixation panel 705), in which case the end panels would differ from the fixation panels 705. In some embodiments, the end panel may be formed by a separate (e.g. solid) plate 1120 for use with a fixation panel 705 (e.g. which may be identical to the other fixation panels 705 in the stack 805). For example, the solid plate 1120 may be sandwiched between two fixation panels 705 (e.g. an end fixation panel and an interior fixation panel) to close the pockets at an end. In some embodiments, the end panels may include a base (e.g. first outer) end panel 715 and a cover (e.g. second outer) end panel 710. The end panels may be configured to bookend the stack 805 of fixation panels 705, for example with the plurality of fixation panels 705 of the stack 805 sandwiched between the cover end panel 710 and the base end panel 715.

In some embodiments, some or all modular storage containers 210 may include forklift slots 810. For example, at least two of the fixation panels 705 and/or the end panels in the stack 805 may include forklift slots 810. In some embodiments, all of the fixation panels 705 may include forklift slots 810, which may be configured to align when the fixation panels 705 and/or end panels are stacked (e.g. oriented properly for alignment). For example, at least one sidewall (e.g. the first sidewall 1201) of each fixation panel 705 may have slots configured for entry of forklift fork tines (e.g. each fixation panel 705 comprises forklift slots 810). In some embodiments, all of the fixation panels 705 and both end panels in the stack 805 may have forklift slots which are configured to align.

In some embodiments, each fixation panel 705 of the plurality of fixation panels may have a first sidewall 1201, a second sidewall 1202, a third sidewall 1203, and a fourth sidewall 1204, for example with the grid of openings 707 disposed therebetween. In some embodiments, the first sidewall 1201 may include the forklift slots 810. In some embodiments, two or more of the sidewalls may have a through-hole configured to provide a passage for a rod 1105 or other attachment device to extend through and secure the cover end panel 710, the plurality of fixation panels 705, and the base end panel 715 together (e.g. in a stack 805 forming the modular storage container 210).

In some embodiments, each fixation panel 705 may have one or more removable stacking features (e.g. protrusion 1220 and corresponding receptacle 1225 or raised lip and corresponding indent, etc.) configured for adjacent stacking arrangement of a plurality of (e.g. identical) fixation panels 705. For example, each fixation panel 705 may have two or more protrusions 1220 and corresponding receptacles 1225, which may be configured to receive the protrusion 1220. In some embodiments, each protrusion 1220 may be located on an opposite face surface of the fixation panel 705 from its corresponding receptacle 1225 (e.g. with the protrusion 1220 extending from the bottom surface of the fixation panel 705, while the receptacle 1225 is located on the top surface of the fixation panel 705). As shown in FIG. 11, when a plurality of fixation panels 705 are stacked, the corresponding protrusion 1220 from a first fixation panel may extend into the corresponding receptacle 1225 on the second (adjacent) fixation panel. For example, the removable stacking features may be disposed on at least two of the sidewalls of each fixation panel 705. In FIG. 8, each sidewall of each fixation panel 705 may have at least two protrusions 1220 and corresponding receptacles 1225. For example, all four corners and/or at least two sidewall midpoints may have protrusions 1220 and corresponding receptacles 1225 located thereat. In FIG. 11, each corner of the fixation panels 705 and the end panels (e.g. 710, 715) have a protrusion 1220 and a corresponding receptacle 1225. In addition, the midpoints of the second and fourth sidewalls (e.g. not the sidewall having the forklift slots or the sidewall opposite that one, which may be flat in order to facilitate stacking of storage containers) may have a protrusion 1220 and corresponding receptacle 1225.

In some embodiments, the end panels 710, 715 may also or alternatively include one or more removable stacking features, such as the protrusions 1220 and corresponding receptacles 1225 (e.g. which may be configured to align and/or stack with those of the fixation panels 705). For example, the base end panel 715 may include a receptacle 1225, and each protrusion 1225 of the plurality of fixation panels 705 may be configured to be receivable in the receptacle 1225 of the base panel 715 (e.g. so that the fixation panel 705 adjacent to the base end panel 715 may have a protrusion 1220 corresponding to and receivable within the receptacle 1225 of the base end panel 715). Similarly, the cover end panel 710 may have a protrusion 1220, and the protrusion 1220 of the cover end panel 710 may be configured for being received in each receptacle 1225 of the plurality of fixation panels 705 (e.g. so that the fixation panels 705 are configured to receive in a corresponding receptacle 1225 the protrusion 1220 from the cover end panel 710).

The corresponding projections of the panels in the stack 805 may be seated within the corresponding receptacles of adjacent panels, for effective stacking, alignment, and/or temporary fixation. In some embodiments, the matching pairs of projections 1220 and receptacles 1225 may be disposed on the exterior or the sidewalls forming the perimeter of the grid of openings 707 (for example projecting laterally outward from the remainder of the panel). While the projections 1220 and receptacles 1225 may be separate elements that are fixed to the panel, in other embodiments the projections 1220 and receptacles 1225 may be integrally formed with the panel. In some embodiments, the one or more removable stacking features may removable couple the stacked fixation panels 705 together. The attachment device may then be used to more securely fix the stacked panels together into a secure modular storage container 210. In some embodiments (e.g. as shown in FIG. 11), the through-hole for receiving the rod 1105 (e.g. attachment device) may extend through one or more (e.g. all) of the matched pairs of protrusions 1220 and receptacles 1225 (e.g. as a bore hole therethrough). For example, the through-hole for the attachment device (e.g. rod 1105) may be located within a receptacle 1225 and extend through a corresponding protrusion 1220 for each fixation panel 705, and the attachment device may include a rod 1105 extending through the through-hole for each corresponding receptacle in the fixation panels 705 and/or end panels. With the rods 1105 in place and fixing/locking the panels together, the modular storage container 210 can be constructed and ready to receive tubular structures 725. In other embodiments, the attachment device may include other attachment elements, such as corresponding tabs and slots on the projections and receptacles (e.g. a clicking or snap-fit system), which may be configured to more securely hold the panels of the modular storage container 210 together, or an adhesive.

In some embodiments, an outer surface of at least one of the first sidewall 1201, the second sidewall 1202, the third sidewall 1203, and the fourth sidewall 1204 comprises a grip surface 1205 such as a ridged profile, a plurality of ridged structures, and/or other friction/grip surfaces configured to resist sliding when contacting a surface (such as a floor or a shelf). In some embodiments, the grip surface 1205 may include high-friction material configured to resist sliding of the modular storage container 210 (e.g. within a storage bank 101). In the embodiment of FIG. 12, the grip surface 1205 (e.g. with ridged profile or ridged structures thereon) is disposed on the exterior surface of the sidewall corresponding to the forklift slots (e.g. the first sidewall 1201). In some embodiments, the storage containers 210 may be configured to be disposed within the storage bank 101 lying on their grip surface side (e.g. with the first sidewalls of the stack of panels facing downward to contact the floor or shelf). In some embodiments, the legs 1005 may be configured to secure the storage container 210 within the storage bank 101, for example by friction surface located thereon or by physical (e.g. interference) locking of the legs within the storage bank. In such instances, for example, the storage containers 210 may be disposed with the legs 1005 contacting the floor of the storage bank 101 (e.g. with tubular structures disposed vertically).

As shown in FIG. 10, some embodiments may further include a plurality of legs/supports 1005, which may extend parallel to the height 1405 of the storage container 210 and/or the longitudinal axis of the pockets of the modular storage container 210. For example, the legs 1005 may extend from the bottom surface of the modular storage container 210 (e.g. from the bottom surface of the base end panel). In some embodiments, the legs 1005 may attach to at least some of the projections 1220 extending from the base end panel 715. The legs 1005 may be configured to support the plurality of fixation panels/container and provide sufficient clearance (e.g. beneath the bottom surface of the base end panel) for forklift fork tines. This may provide an alternate or additional mechanism for forklift use in conjunction with the modular storage containers 210. The legs 1005 may be separate elements which attach to the base end panel, or may be integral with the base end panel.

In some embodiments, the end panels (e.g. at least the cover end panel 710) may be removably attached to the stack 805 of fixation panels 705 in such a way as to allow for removal of the end panel independently of the other fixation panels. This would enable removal of the cover end panel 710, for example, while the other fixation panels 705 forming the storage container 210 may remain fixed together forming a joined storage box capable of holding the tubular structures 725 (e.g. even with the top cover panel 710 removed). For example, in FIGS. 11 and 16, the rods 1105 may extend through the base end panel 715 and all of the interior fixation panels 705 (of the stack 805), but may not extend through the cover end panel 710. In FIG. 16, for example, the cover end panel 710 may be held in place on the modular storage container 210 by the protrusions 1220 on the bottom surface of the cover end panel 710 inserting into the corresponding receptacles 1225 on the adjacent (e.g. uppermost) fixation panel 705. Alternately or additionally, the cover end panel 710 may be held in place via its own separate attachment device (e.g. separate set of bolts and/or nuts which may be screwed in opposite the attachment device for the stack 805).

Based on the number of fixation panels 705 in the stack 805, the modular storage container 210 may be height adjustable (e.g. with the height/length 1405 of the pockets being configurable based on the number of fixation panels 705 in the stack 805, allowing the modular storage container 210 to hold tubular structures 725 of different lengths). Also, if portions of the modular storage container 210 are damaged during usage, only the fixation panels 705 which were damaged need to be replaced with alternate, substitute, undamaged fixation panels 705 (e.g. only the portion of the plurality of fixation panels 705 of the modular storage container 210 which were damaged need to be replaced). Such benefits of the modular storage containers 210 may provide more flexibility and economy of use.

In some alternate embodiments (not shown), the storage containers 210 may not be modular (e.g. may not be formed of a plurality of fixation panels). For example, the storage containers 210 may be integral boxes or containers with opening pockets therethrough. In some embodiments, the storage containers 210 may be similar in form, shape, or structure to the overall modular storage container 210 described herein, but may not be formed of separate panels and/or may not be height adjustable. In some embodiments, for example as shown in FIG. 4, the storage containers 210 may be removable from the storage bank 101 (e.g. removably held within the storage bank 101, for example oriented for lateral removal of the storage containers 210 from the storage bank 101 and/or lateral orientation of the tubular structures 725 within the storage bank 101). In some embodiments, one or more of the storage containers 210 may be fixed within the storage bank 101 and/or permanent (e.g. not easily removable (for example without tools and/or without significant time and/or effort to uncouple) or integral to the storage bank 101). For example, a grid of pockets with outward-facing openings may be fixed within the storage bank 101 (e.g. not a separate, removable storage container). In some embodiments, the grid of pockets may be permanently attached and/or integral to the storage bank 101.

Returning to FIGS. 1A-6 and 9 in more detail, a transport system for a plurality of tubular structures 725 may include a storage bank 101 configured to hold the plurality of tubular structures 725, for example within a grid of pockets (e.g. similar to those described above with respect to the modular storage containers 210). The storage bank 101 may be a container (e.g. box-like), which may be larger than the storage container 210 (e.g. the modular storage container) which is configured to directly hold the tubular structures 725. In some embodiments, the exterior of the storage bank 101 may be clad in metal panels (e.g. a metal frame sheathed in metal panels). In some embodiments, the storage bank 101 exterior (when all doors are closed) may completely enclose/encompass the interior of the storage bank, for example forming an enclosed interior configured to shelter/protect the storage containers 210, tubular structures 725, and/or tool string portions. Typically, the storage bank 101 may be large enough to hold a plurality of modular storage containers 210 (e.g. of the sort described herein). For example, the storage bank 101 may be configured to be able to hold at least 10 modular storage containers, at least 16 modular storage containers, 10-16 modular storage containers, or 10-20 modular storage containers. In some embodiments, each storage container 210 may be configured to hold a specific size (e.g. diameter) of tubular structure (e.g. perforating gun). In some embodiments, the storage bank 101 may hold a plurality of storage containers 210 configured to hold different size tubular structures 725. For example, at least one storage container 210 may hold 3⅛ inch outer diameter perforating guns, at least one storage container 210 may be configured to hold 2¾ inch outer diameter perforating guns, and/or at least one storage container 210 may be configured to hold 3½ inch outer diameter perforating guns. In some embodiments, the storage bank 101 may be configured externally as a shipping container (see for example FIGS. 1A-B) or a truck trailer (see for example FIGS. 17-22), for example with external dimensions similar to a standard shipping container or truck trailer. For example, the storage bank 101 may have external dimensions of 20-30 feet long, 8-8.5 feet wide, and/or 8-8.5 feet tall. In some embodiments, the storage bank 101 may be configured as a truck trailer, for example with wheels and/or a hitch for being pulled behind a truck. See for example, FIGS. 17-21.

In some embodiments, the storage bank 101 may include a plurality of compartments 201, each of which may be configured to hold 1-2 modular storage containers 210. In some embodiments in which the compartments 201 are configured to hold two modular storage container 210, the compartments 201 may be configured to encompass a stack of two modular storage containers 210 (e.g. either directly stacked atop one another or stacked using shelving). The storage bank 101 may be configured to allow access to the tubular structures 725 therein (e.g. retained in a storage container 210) laterally, for example with one or more access doors 205 disposed on at least one lateral side of the storage bank 101. In some embodiments, the tubular structures 725 may be held (e.g. laterally within the storage bank 101) within a grid of pockets configured/oriented perpendicular to a longitudinal center axis 105 of the storage bank 101 (e.g. with laterally facing openings, with the openings facing outward away from the longitudinal center axis 105 of the storage bank 101), and the tubular structures 725 may be disposed laterally in the storage bank 101 (e.g. perpendicular to the longitudinal axis 105 of the storage bank 101). Some embodiments may include one or more doors 205 on a side of the storage bank 101 (e.g. configured for accessing the grid of pockets and/or allowing lateral removal of tubular structures 725 from the grid of pockets and/or allowing lateral removal of storage containers 210 having the grid of pockets and/or the tubular structures 725).

In some embodiments, the grid of pockets may be fixed (e.g. permanently attached and/or integral) within the storage bank 101 and the plurality of tubular structures 725 may be individually removed from the storage bank 101 by sliding laterally out of the grid (via the laterally facing openings). In other embodiments, the grid of pockets may be disposed in one or more storage containers 210 configured to removably fit (e.g. be held) within a compartment 201 of the storage bank 101 and/or to orient the plurality of tubular structures 725 laterally within the storage bank 101 (e.g. perpendicular to the longitudinal axis 105 of the storage bank 101). For example, the storage container 210 may be similar to embodiments described herein, such as modular storage container 210 shown in FIGS. 8 and 10. The height 1405 of the storage containers 210 may be configured based on the length of the tubular structures 725 to be held therein, and may be less than the lateral width of the storage bank 101, less than ½ of the lateral width of the storage bank 101, or from ½ to ⅓ the lateral width of the storage bank 101. Typically, the storage containers 210 may be inserted into the storage bank 101 on their side (e.g. with the first sidewalls of the fixation panels oriented downward), so that the longitudinal axis of the plurality of pockets of the storage container 210 and/or the height 1405 of the storage container 210 may extend laterally within the storage bank 101, for example perpendicular to the longitudinal center axis 105 of the storage bank 101.

In some embodiments, as shown in FIGS. 2 and 4 for example, the storage bank 101 (e.g. one or more compartment 201 within the storage bank) may be configured to allow for at least two vertical layers of storage containers 210 (e.g. vertical stacking of storage containers 210). For example, the compartment 201 and/or the storage bank 101 may comprise shelving 505 configured to hold the storage containers 210, with the shelving 505 allowing vertical layers of storage containers 210 to be disposed within the compartment/storage bank 101). In some embodiments, the storage containers 210 may each have a grip surface 1205, for example so that friction forces may prevent excessive sliding/movement of the storage containers 210 during movement (e.g. transport) of the storage bank 101. In some embodiments, the storage bank 101 and/or storage containers 210 may have a clamp or lock mechanism configured to retain the storage containers 210 in place in the storage bank 101, thereby preventing movement (e.g. sliding) of the storage containers 210 during movement (e.g. transport) of the storage bank 101.

The storage containers 210 may be removable from the storage bank 101 (e.g. removably disposed within the storage bank 101, as shown in FIG. 4). In other embodiments, the storage containers 210 may be fixed (e.g. permanently attached-not readily removably) within the storage bank 101. For example, in FIG. 9, the storage containers 210 may be fixed within the storage bank 101. Some embodiments of the storage bank 101 may have the grid of pockets disposed (e.g. fixed) therein without separate storage compartments and/or without separate storage containers. Storage containers 210 may be similar to those described herein (modular or not).

In some embodiments, only a portion (e.g. a first portion) of the storage bank 101 is configured to hold storage containers 210 (e.g. laterally). For example, only a portion of the storage bank 101 may have lateral storage compartments 403 configured to hold the storage containers 210. In FIG. 2, only one side of the storage bank 101 is configured to hold storage containers 210 (e.g. with laterally-accessible compartments, each occupying less than the lateral width of the storage bank 101, or in some instances less than ½ the lateral width of the storage bank 101). For example, the lateral compartments 403 configured to hold storage containers 210 may each occupy no more than ½ of the lateral width of the storage bank 101. Likewise, the storage containers 210 for use therein may have a height/length that is less than half the lateral width of the storage bank 101. In FIGS. 17-22, two lateral compartments 403 may be disposed laterally side-by-side within the storage bank 101, for example with one such lateral compartment 403 accessible on one lateral side of the storage bank 101 and the other such lateral compartment 403 accessible on the opposite lateral side of the storage bank 101. The lateral compartments 403 may be sized and/or configured to hold one or more (e.g. stacked) storage compartments 210, for example orienting the tubular structures 725 therein perpendicular to the longitudinal center axis 105 of the storage bank 101. In some embodiments, a plurality of lateral storage compartments 403 may be disposed along the length of the storage bank 101. For example, 5-10, 6-9, or 6-8 lateral storage compartments may be disposed in series along the length of the storage bank 101 (e.g. each lateral storage compartment 403 may have a width (e.g. extending parallel to the longitudinal axis of the storage bank) that is less than half the length of the storage bank 101, for example a width that is ⅕-1/10 the length of the storage bank 101). In some embodiments, each lateral compartment 403 may have a width that is slightly wider than the storage container(s) 210 which will be held therein (e.g. greater than the width of the storage container but no more than 1.25 times the width of the storage container). Doors 205 for accessing the lateral storage compartments 403 may be located on one or both of the lateral sides of the storage bank 101. In some embodiments, the lateral compartments may be disposed in a lower layer or level of the storage bank 101.

Another portion (e.g. a second portion) of the storage bank 101 may be configured to hold a tool string or portion of a tool string 550 oriented longitudinally (e.g. extending approximately parallel of the longitudinal axis of the storage bank 101). For example, the tool string 550 or portion thereof is generally longer than a single perforating gun, longer than a storage container 210 (e.g. for holding tubular structures 725) or lateral compartment 403, and/or longer than the lateral width of the storage bank 101. The tool string 550 or portion thereof may be formed of multiple perforating guns or a single perforating gun in combination with at least one other downhole tool. The second portion of the storage bank 101 may include one or more longitudinal compartments 503 configured to hold the tool string 550 or portion of the tool string (e.g. approximately parallel to the longitudinal axis 105 of the storage bank 101). The longitudinal compartment(s) 503 may have a longitudinal axis that is approximately parallel to the longitudinal center axis of the storage bank. In some embodiments, the longitudinal compartments may have a length that is greater than the lateral width of the storage bank 101. In some embodiments, the longitudinal compartment(s) may extend substantially the length of the storage bank 101. The one or more longitudinal compartments 503 may be laterally accessible (e.g. with doors on the side opposite those for accessing the lateral compartments) as shown in FIG. 5A, or may be longitudinally accessible (e.g. through an end of the storage bank) as shown in FIG. 21. The longitudinal compartment(s) 503 may have a length greater than that of the lateral storage compartments 403.

The portion of the storage bank 101 configured to hold at least a portion of a tool string 550 (e.g. the second portion or longitudinal compartment of the storage bank) may include supports (e.g. shelves 505 or arms) configured to hold the portion(s) of the tool string 550. In some embodiments, the supports may be configured to hold a plurality of vertical layers of tool strings 550 or portions thereof, for example having multiple vertical shelves 505 or levels/layers. In some embodiments, the supports may further include fasteners (e.g. clamps) configured to secure the portion of the tool string 550 to the supports (e.g. to prevent significant movement of the tool string 550 or portion thereof during movement of the storage bank 101). In some embodiments, each layer/level of shelving 505 may be configured to hold 3-10 (for example 3-6) portions of tool string 550 (e.g. disposed side-by-side on the shelf). In some embodiments, the longitudinal compartment 503 may have 2-4 layers/levels of shelving 505. In some embodiments, there may be two longitudinal compartments 503, with one on each side of the longitudinal centerline 105 of the storage bank 101 (e.g. symmetrical about the longitudinal centerline as shown in FIG. 21). In some embodiments, the storage bank 101 interior configuration (e.g. the lateral and longitudinal compartments) may be symmetrical (e.g. mirror image) about the longitudinal centerline plane of the storage bank 101.

In some embodiments, the storage bank 101 includes one or more lateral compartments 403 and one or more longitudinal compartments 503. The lateral compartments 403 may be laterally accessible (e.g. via side doors 205 on one or more lateral side of the storage bank 101). The longitudinal compartments 503 may be accessible either longitudinally via end doors or via side doors.

As shown in FIGS. 4-5A, in some embodiments, all of the lateral compartments 403 are disposed on a first side of the storage bank 101 (e.g. and accessible via the first side), and the one or more longitudinal compartment 503 is disposed on a second side of the storage bank 101 (e.g. laterally opposite the first side, for example disposed on the opposite side of the longitudinal centerline axis 105 of the storage bank 101 and/or accessible via the second side). The first side of the storage bank 101 in such a configuration may be configured to hold more densely packed volume than the second side (e.g. the second side/longitudinal compartments not as efficiently packed as the first side/lateral compartments). In other embodiments, the one or more longitudinal compartments 503 may be vertically disposed within the storage bank 101 (e.g. either above or below) relative to the lateral compartments 403. For example, the one or more longitudinal compartments 503 may be disposed above the lateral compartments 403 within the storage bank 101 (e.g. as shown in in FIG. 21). In some embodiments, one or more lateral compartments 403 may be disposed on each side of the storage bank 101, for example with at least a first lateral compartment accessible via a first side of the storage bank and at least a second lateral compartment accessible via a second side of the storage bank. In some embodiments, a plurality (e.g. a row) of lateral compartments 403 may be disposed on each side of the storage bank, for example forming side-by-side rows of lateral compartments 403 that extend longitudinally within the storage bank 101. For example, one row of lateral compartments 403 may be disposed on one side of the longitudinal centerline axis of the storage bank 101, and a second row of lateral compartments 403 may be disposed on the opposite side of the longitudinal centerline axis of the storage bank 101.

Some embodiments of the storage bank 101 may include still further compartments. For example, the storage bank 101 may further include a discard container 520 such as a Red Box®-type container (e.g. which may be similar in construction to storage containers 210, but which is configured to hold any perforating guns that malfunction, for example due to a faulty perforating gun or detonator-in some embodiments, the discard container 520 may be color coded (e.g. red) to distinguish it visually from other storage containers), one or more separate compartments 433 configured to retain one or more detonators, detonator cord, settling tool, additional tools to build the tool string, etc., and/or a recycling container 553 (e.g. configured to hold used elements which may be recyclable). In some embodiments, the discard container 520 may be removably disposed within the storage bank 101. In some embodiments, the recycling container 553 may be fixed within the storage bank 101 (e.g. integrally formed). In some embodiments, the discard container 520 and recycling container 553 may be disposed on the same lateral side of the storage bank 101 as the longitudinal compartment 503, while the one or more separate compartment 433 may be disposed on the same lateral side of the storage bank 101 as the lateral compartments 403 (see for example FIG. 5A). In some embodiments, one or more of the discard container 520, recycling container 553, and the one or more separate compartments 433 may be disposed in a front upper portion of the storage bank 101 (e.g. which may be configured to project outward over a portion of a truck, for example with respect to hitching the storage bank to the truck) and/or in a rear lower portion of the storage bank 101 extending over the wheel well(s) (e.g. of the incorporated wheels attached to the rear of the storage bank when configured as a truck trailer). See for example FIGS. 19-20. In some embodiments, the recycling container 553 may include a hole sized and shaped to allow for insertion of used tubular structures 725 (e.g. with a diameter slightly larger than the largest tubular structures 725 held within the storage bank 101).

With regard to modular storage containers (such as those described herein), methods of forming such a modular storage container may include stacking and removably attaching a plurality of fixation panels to jointly support and/or form a grid of pockets configured to retain and/or encompass a plurality of tubular structures individually within their own pocket. Stacking fixation panels may include orienting the plurality of fixation panels so that the openings of the fixation panels are aligned to form a grid of pockets configured to retain tubular structures. Method embodiments may further include the step of providing a plurality of fixation panels, which typically may all be identical.

Some method embodiments may further include the step of providing end panels and removably attaching the end panels to the stack of fixation panels. For example, the stack of fixation panels may be sandwiched between the end panels. In some embodiments, each of the end panels may be formed of a fixation panel and a plate (for example, with the plate disposed between the fixation panel of the end panel and another (e.g. top or bottom) fixation panel of the stack). In some embodiments, the cover end panel may be attached so that it may be removed while the remainder of the fixation panels/storage container remains fixed together.

In some embodiments, removably attaching the fixation panels may include using an attachment device to fix the stack of fixation panels together into a modular storage container. In some embodiments, removably attaching fixation panels may include inserting protrusions from one fixation panel into receptacles of another (e.g. adjacent) fixation panel and/or inserting rods through through-holes in the receptacles Some method embodiments may further comprise the step of orienting the fixation panels to align their openings to form the pockets. In some embodiments, at least two of the panels may have forklift slots, and the method may further include the step of orienting the panels to align the forklift slots. Some embodiments may further include the step of attaching legs to an end panel (e.g. a base end panel).

Some method embodiments may further include the step of selecting the number of fixation panels to stack based on the length of the tubular structure to be retained therein (e.g. stacking a number of fixation panels to provide a height of the modular storage container sufficient to retain tubular structures of a certain length). Some method embodiments may further include the step of loading a plurality of tubular structures (e.g. at least 100 tubular structures, which may be perforating guns or perforating gun assemblies) into the grid of pockets, wherein each tubular structure is encompassed by a corresponding pocket and separated from the other tubular structures (e.g. by the pockets). Some embodiments may further include the step of inspecting fixation panels for damage, and upon detecting damage to a fixation panel, removing the damaged fixation panel from the stack and replacing it with an undamaged fixation panel (e.g. which may be identical).

Other methods relate to loading tubular structures (such as perforating guns and/or perforating gun assemblies) into a storage bank. For example, method embodiments may include the steps of loading a plurality of tubular structures into a storage container (e.g. similar to those described herein), and loading the storage container into the storage bank (e.g. laterally and/or via a side door). In some embodiments, the storage container may be oriented within the storage bank so as to laterally orient the tubular structures therein. In some embodiments, each tubular structure and/or storage container may have a length less than the lateral width of the storage bank. For example, the length of each tubular structure and/or storage container may be no more than ½, no more than ⅓, no more than ¼, ¼-½, ⅓-½, or ¼-⅓ of the lateral width of the storage bank. In some embodiments, the plurality of tubular structures may be loaded into a plurality of storage containers, and the plurality of storage containers, may then be loaded into the storage bank and laterally oriented (e.g. with the tubular structures oriented laterally, with their longitudinal axes perpendicular to the longitudinal center axis of the storage bank and/or extending in the width direction of the storage bank). Each of the storage containers may be configured to retain over 100 tubular structures. As described herein, each storage container may have a grid of pockets each configured to retain a single tubular structure (e.g. disposed within a perimeter formed of sidewalls), with the pockets separating each tubular structure from other of the plurality of tubular structures. In some embodiments, loading a plurality of tubular structures into a storage container may include sliding each of the plurality of tubular structures into an individual pocket (e.g. of the grid of pockets).

In some embodiments, the storage bank may include a plurality of lateral compartments, and each storage container may be configured to fit within one of the plurality of lateral compartments. For example, the storage containers may be loaded into lateral compartments via side doors in the storage bank. Some embodiments may further include stacking two storage containers within a single lateral compartment of the storage bank. For example, the lateral compartment may have shelving, and the shelving may be configured to allow for supported stacking of the two storage containers within a compartment.

In some embodiments, each storage container may have forklift slots, and loading the storage container into the storage bank may include moving the storage container into the storage bank via forklift (e.g. with the forklift fork tines inserted into the forklift slots of the storage container). For example, this may allow loading of the storage containers into the storage bank without an underlying pallet (e.g. disposed beneath the storage container). Alternatively, each storage container may be disposed on a pallet, and the pallet may be configured to be lifted by forklift.

Some embodiments of the method may further include orienting the storage container so that friction/grip surfaces contact a supporting surface (e.g. bottom of the storage bank, top of another container on which it is stacked, shelf, etc.). The grip surface may prevent or minimize sliding of the storage container within the storage bank when the storage bank is being moved (e.g. transported to or from a wellsite).

Other methods relate to management of downhole tools (e.g. at a wellsite, during transport, and/or during storage). For example, methods may include one or more of the following steps:

providing a plurality of tubular structures (e.g. perforating guns and/or perforating gun assemblies) and a storage bank having at least one lateral compartment (e.g. configured to retain the plurality of tubular structures) and at least one longitudinal compartment (e.g. configured to retain portions of spent tool strings), with the longitudinal compartment extending longitudinally in the storage bank and having a length greater than the lateral width of the storage bank and the lateral compartment being no more than ½ the lateral width of the storage bank;

transporting the plurality of tubular structures to the wellsite in the storage bank, wherein the plurality of tubular structures are oriented laterally in the storage bank (e.g. in a lateral compartment)-in some embodiments, a portion of the storage bank is configured for longitudinal storage of at least a portion of a tool string, with said portion of the storage bank (e.g. the longitudinal compartment) being empty of tool string portions during transport to the wellsite;

unloading the tubular structures from the storage bank (e.g. at the wellsite);

after attaching the tubular structures into a tool string, running the tool string into the well at the wellsite, and using the tubular structures (e.g. detonating the perforating guns to perforate the well);

removing the tool string from the well and optionally breaking the tool string into tool string portions, with each tool string portion typically longer than a single tubular structure (e.g. perforating gun and/or perforating gun assembly) and/or having a length greater than the lateral width of the storage bank);

loading the used tool string or portions thereof into the longitudinal compartment (e.g. a separate longitudinal compartment) of the storage bank (e.g. with the tool string or portion thereof extending longitudinally within the storage bank, for example approximately parallel to the longitudinal axis of the storage bank); and/or transporting the used tool string or portions thereof away from the wellsite.

In some embodiments, the longitudinal compartments may be disposed above the lateral compartments. In some embodiments, the lateral compartments may be disposed on both sides of the storage bank, allowing for tubular structures to be loaded in a way that provides a neutral center of gravity (e.g. approximately balanced about the longitudinal axis). For example, on the way to the site, the longitudinal compartments may be empty, with the tubular structures disposed in the lateral compartments, and the tubular structures may be disposed in lateral compartments on both sides of the storage bank for balance purposes. When leaving the site, the one or more longitudinal compartments may be loaded/full (e.g. of tool strings or portions thereof-not empty) and/or the lateral compartments may be empty of tubular structures (e.g. holding only empty storage containers and/or fixation panels). In some embodiments, when leaving the wellsite, the longitudinal compartments may retain at least portions of the tool string (e.g. be loaded-not empty), while at least some of the lateral compartments and/or the grid of pockets (e.g. of the storage compartments) therein may be empty of tubular structures and/or not full (e.g. holding less tubular structures when leaving the wellsite than when going to the wellsite).

Some method embodiments may further include (laterally) loading the plurality of tubular structures into the storage bank. In some embodiments, loading the plurality of tubular structures into the storage bank may include loading the plurality of tubular structures into a plurality of storage containers (e.g. each having a grid of pockets configured to retain the tubular structures), and loading the plurality of storage containers (e.g. laterally) into the storage bank. In some embodiments, when the storage containers are disposed in the storage bank, the tubular structures are laterally oriented in the storage bank.

In some embodiments, unloading the tubular structures comprises unloading (e.g. laterally, via side doors) the storage containers from the storage bank, and unloading the tubular structures from the storage container, for example by individually removing each tubular structure from its independent pocket in the storage container. In some embodiments, unloading the storage container may be via forklift, for example using the forklift slots in the storage container to allow unloading without the use of pallet. In some embodiments, unloading the tubular structures may involve individually accessing each tubular structure and removing it from its own individual separate pocket. Unloading the tubular structures from the storage containers may leave empty storage containers (or storage containers which are not full), and the empty storage containers may then be reloaded into the storage bank (e.g. laterally, into the lateral compartments) for transport away from the wellsite. Then, after transporting the used tool string away from the site, the empty storage containers may be unloaded from the storage bank.

In some embodiments, the empty storage containers may be reused. For example, the storage containers may be disassembled (e.g. disassembling the fixation panels of storage containers, by releasing/removing the attachment device). Any damage to the panels may be assessed, with any damaged panels being removed and/or replaced (e.g. by undamaged substitute panels), so that undamaged panels may be reused to form further storage containers of the required height/length. In some method embodiments, providing storage containers may comprise forming storage containers from a plurality of fixation panels. In some embodiments, this may include selecting the number of fixation panels to stack (e.g. to form the storage container) based on the length of the tubular structures to be retained therein.

Use of the disclosed devices, systems, and methods may provide one or more useful advantages. For example, modular storage containers may allow for the size/height of the storage containers to be easily selected and constructed based on the specific length of the tubular structures to be housed therein. Further, the modular storage containers may allow for replacement only of damaged panels, thereby allowing effective reuse of undamaged panels for more cost-effective containers. The storage containers may also effectively retain and support the perforating guns, for example with each gun being cradled in its own pocket to minimize rattling. A storage bank configured with at least one lateral compartment and at least one longitudinal compartment may provide for more effective loading and unloading of elements and/or more effective management of elements at the wellsite. Depending on the configuration of the storage bank, more balanced loading may provide for better transport characteristics and/or improved safety. Any features described as being on all (e.g. each of the) panels or all fixation panels could, in some embodiments, be located on only some of the panels. Persons of skill will understand these and other advantages based on the disclosure herein.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Approximating language, as used herein throughout the specification and claims, may be applied to modify any quantitative representation that could permissibly vary without resulting in a change in the basic function to which it is related. Accordingly, a value modified by a term such as "about" or "approximately" is not to be limited to the precise value specified. Such approximating language may refer to the specific value and/or may include a range of values that may have the same impact or effect as understood by persons of ordinary skill in the art field. For example, approximating language may include a range of +/−10%, +/−5%, or +/−3%. The term "substantially" as used herein is used in the common way understood by persons of skill in the art field with regard to patents, and may in some instances function as approximating language. In some instances, the approximating language may correspond to the precision of an instrument for measuring the value.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A modular storage container for a plurality of tubular structures, comprising:
   a plurality of fixation panels each comprising a plurality of openings therethrough configured for receiving and bounding a portion of each of the plurality of tubular structures;
   wherein the plurality of fixation panels are configured to be used together such that corresponding openings of the plurality of openings in each of the fixation panels align to form a plurality of aligned openings configured to retain the tubular structures;
   for each fixation panel, each of the openings are surrounded by struts forming a grid of the openings;
   each fixation panel of the plurality of fixation panels further comprises a first sidewall, a second sidewall, a third sidewall, and a fourth sidewall;
   the grid of openings is disposed within a perimeter formed by the first sidewall, the second sidewall, the third sidewall, and the fourth sidewall; and
   the first sidewall of each fixation panel comprises forklift slots.

2. The modular storage container of claim 1, wherein the plurality of fixation panels are configured to be stacked adjacent each other to form a plurality of pockets configured to hold the tubular structures, and wherein each pocket of the plurality of pockets is configured to hold a single tubular structure.

3. The modular storage container of claim 1, further comprising an attachment device configured to removably attach the plurality of fixation panels in stacked arrangement.

4. The modular storage container of claim 2, wherein the modular storage container is height adjustable based on the number of fixation panels which are stacked.

5. The modular storage container of claim 2, further comprising two end panels each configured to be stacked adjacent a fixation panel and prevent longitudinal movement of the tubular structures within the pockets, wherein the plurality of fixation panels are disposed between the two end panels.

* * * * *